(12) United States Patent
Ishii

(10) Patent No.: US 10,584,768 B2
(45) Date of Patent: Mar. 10, 2020

(54) CORD LOCK

(71) Applicant: NIFCO INC., Yokosuka-shi, Kanagawa (JP)

(72) Inventor: Taiyo Ishii, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 0 days.

(21) Appl. No.: 16/307,074

(22) PCT Filed: Jun. 1, 2017

(86) PCT No.: PCT/JP2017/020489
§ 371 (c)(1),
(2) Date: Dec. 4, 2018

(87) PCT Pub. No.: WO2017/213023
PCT Pub. Date: Dec. 14, 2017

(65) Prior Publication Data
US 2019/0145496 A1 May 16, 2019

(30) Foreign Application Priority Data

Jun. 6, 2016 (JP) .................................. 2016-112435

(51) Int. Cl.
*F16G 11/00* (2006.01)
*F16G 11/03* (2006.01)
(Continued)

(52) U.S. Cl.
CPC .............. *F16G 11/03* (2013.01); *A43C 1/00* (2013.01); *A43C 11/14* (2013.01); *A44B 17/0011* (2013.01); *A44B 99/00* (2013.01)

(58) Field of Classification Search
CPC ... A43C 1/06; A43C 1/00; F16G 11/14; F16G 11/101
See application file for complete search history.

(56) References Cited

U.S. PATENT DOCUMENTS 4,506,417 A * 3/1985 Hara ..................... F16G 11/14
24/115 G
6,658,704 B2 12/2003 Buscart
(Continued)

FOREIGN PATENT DOCUMENTS

JP 2002-186505 A 7/2002
JP 2003-204808 A 7/2003
(Continued)

OTHER PUBLICATIONS

PCT/ISA/210, "International Search Report for International Application No. PCT/JP2017/020489," dated Jun. 1, 2017.
(Continued)

*Primary Examiner* — Jack W Lavinder
(74) *Attorney, Agent, or Firm* — Manabu Kanesaka

(57) ABSTRACT

A pressing portion is housed movably in a front-and-back direction inside a main member portion. In the main member portion, two main-member-portion holes through which a string member passes are formed on a side wall forming an opening portion. The pressing portion includes a pressing face on a front face, and internally provides a pressing-portion string insertion portion which can communicate with the two main-member-portion holes and through which the string member passes. A bend insertion portion for inserting the string member to pass through by bending the string member inside the pressing portion is provided. An urging device for urging the pressing portion is provided at a position wrapping a virtual three-dimensional shape obtained by connecting, with straight lines, two imaginary faces on which an inner face of the side wall and an outer shape of the string member passing through the two main-member-portion holes intersect.

8 Claims, 36 Drawing Sheets

(51) Int. Cl.
*A44B 99/00* (2010.01)
*A43C 1/00* (2006.01)
*A43C 11/14* (2006.01)
*A44B 17/00* (2006.01)

(56) References Cited

U.S. PATENT DOCUMENTS

| | | | |
|---|---|---|---|
| 8,181,320 B2 * | 5/2012 | Wolfberg | A43C 7/08 24/115 G |
| 2009/0094798 A1 | 4/2009 | Yao | |
| 2018/0317612 A1 | 11/2018 | Koreishi | |

FOREIGN PATENT DOCUMENTS

| | | |
|---|---|---|
| JP | 2013-000270 A | 1/2013 |
| JP | 2015-134052 A | 7/2015 |
| JP | 2016-022336 A | 2/2016 |
| JP | 2017-086312 A | 5/2017 |

OTHER PUBLICATIONS

Japan Patent Office, "Office Action for Japanese Patent Application No. 2016-112435," dated May 7, 2019.

* cited by examiner

CORD LOCK

FIELD OF TECHNOLOGY

The present invention relates to a cord lock.

BACKGROUND ART

Conventionally, there is known a "string fastener" which is a box-type string fastener so as to pass strings linearly, and wherein a coil spring is disposed at a shifted position where the coil spring is offset relative to the strings (see paragraph number [0027], FIG. 1, FIG. 15, and FIG. 16 of Patent Document 1).

PRIOR ART DOCUMENT

Patent Document

Patent Document 1: Japanese Patent Application Publication No. 2015-134052

SUMMARY OF THE INVENTION

Problems to be Solved by the Invention

In the aforementioned conventional "string fastener", however, there is a problem such that since a hollow portion for passing the strings linearly and an axis of a coil spring are arranged side by side, a spring comes to a state of pressing by tilting a pressing portion of a male member so as to become difficult to generate a holding load of the strings. Consequently, if a load of the spring is increased in order to enhance a holding force, there is a possibility that an operation load for releasing the strings increases as well.

Also, in the aforementioned conventional "string fastener", there is a second problem such that if the pressing portion tilts, the pressing portion is caught on a female member so as to become a resistance, so that there is a possibility to increase a release load, or to become a factor of deterioration of operability. Thus, since the strings are linear, it is difficult to generally obtain the holding force.

There, the present invention is made in view of the problems in the aforementioned conventional technology, and an object of the present invention is to improve the holding force of a string member.

Means for Solving the Problems

In order to obtain the aforementioned object, the present invention has the following characteristics.

First, a cord lock comprises the following structure.

(1) Main Member Portion

The main member portion includes an opening portion on a front face.

(2) Pressing Portion

The pressing portion is housed movably in a front-and-back direction inside the main member portion.

Secondly, in the main member portion, there are formed two main-member-portion holes through which a string member passes on a side wall (for example, an outside wall of the main member portion) forming the opening portion.

Thirdly, in the pressing portion, there is included a pressing face on a front face, and on an inside thereof, there is provided a pressing-portion string insertion portion which can communicate with the two main-member-portion holes and through which the string member passes.

Fourthly, there is provided a bend insertion portion for inserting the string member to pass through by bending the string member inside the pressing portion.

Fifthly, there is provided an urging device (for example, a coil spring) for urging the pressing portion to a front of the main member portion at a position wrapping a virtual three-dimensional shape obtained by connecting, with straight lines, two imaginary faces on which an inner face of the side wall (for example, the outside wall of the main member portion) and an outer shape of the string member passing through the two main-member-portion holes intersect.

The present invention may be embodied as in the following first aspect.

The urging device is a coil spring housed in a cylinder concave portion provided in the pressing portion.

According to the aspect, an installation space of the urging device can be reduced, and an urging force can be surely generated.

The present invention may be embodied as in the following second aspect.

The bend insertion portion is provided in such a way so as to pass a peripheral wall of the cylinder concave portion.

According to the aspect, the bend insertion portion can be made small.

The present invention may be embodied as in the following third aspect.

The bend insertion portion inserts the string member to pass through outside an imaginary line connecting between hole edges on a same side of the two main-member-portion holes.

According to the aspect, a holding force of the string member can be enhanced further by increasing bending of the bend insertion portion.

The present invention may be embodied as in the following fourth aspect.

Two openings of the pressing-portion string insertion portion and two main-member-portion holes are located at a substantially same position.

According to the aspect, even between edges of the opening of the pressing portion and the main-member-portion hole, the holding force of the string member can be generated.

The present invention may be embodied as in the following fifth aspect.

One portion on an opposite face side of the pressing face of the pressing portion is formed by opening in the bend insertion portion.

According to the aspect, the bend insertion portion can be easily formed.

Effect of the Invention

According to the present invention, the urging device is provided at the position wrapping the virtual three-dimensional shape obtained by connecting, with the straight lines, the two imaginary faces on which the inner face of the side wall and the outer shape of the string member passing through the two main-member-portion holes intersect, so that the urging force of the urging device surely transmits to the string member. Also, the bend insertion portion for inserting the string member to pass through by bending the string member inside the pressing portion is provided so as to improve the holding force of the string member.

BRIEF DESCRIPTION OF THE DRAWINGS

FIG. 18 is a vertical cross-sectional view of the cord lock which corresponds to FIG. 17 and is in a state wherein a string member is passed through.

FIG. 25 is a vertical cross-sectional view of the cord lock which corresponds to FIG. 24 and is in the state wherein the string member is passed through.

BEST MODES OF CARRYING OUT THE INVENTION (Cord Lock 10)

With FIG. 1 to FIG. 18, a cord lock according to the first embodiment of the present invention will be explained.

Figure 1:
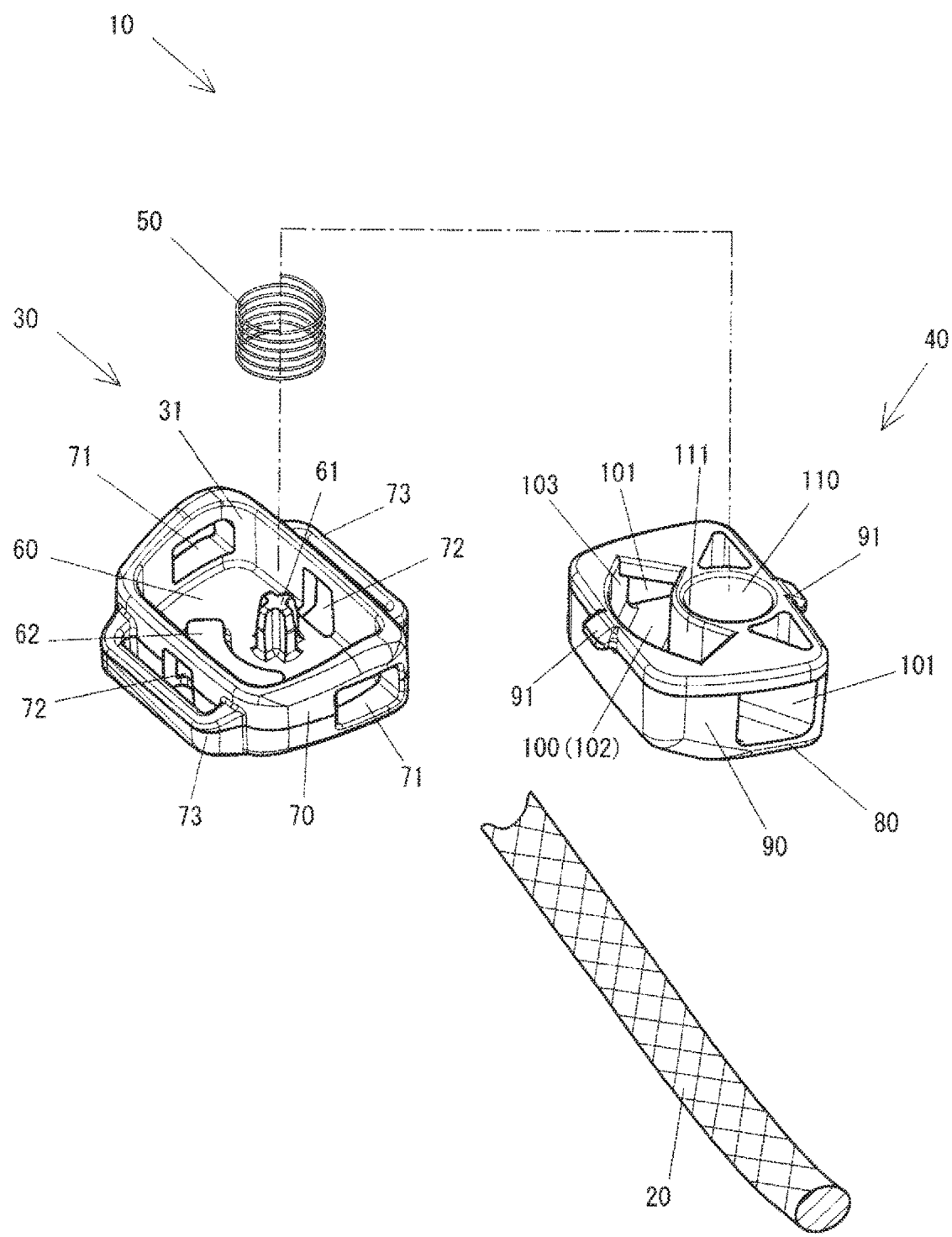
FIG. 1 is an exploded perspective view of a cord lock according to one embodiment of the present invention.

In FIG. 1, the reference numeral 10 is used for a length adjustment of a string member 20 by inserting the string member 20 passing through a hood, a hem, or the like of clothes and the like such as an outdoor jacket with a hood and the like (not shown in the drawings).

As the string member 20, there are included a round string, a flat string, a tape, a band, a cord, and the like.

Incidentally, although the cord lock 10 is used for the string member 20 of the clothes and the like, it is not limited to the above, and may be used for a bag, a rucksack, a small article bag, shoes, or a harness and the like.

As shown in FIG. 1, the cord lock 10 is roughly formed by the following parts.

Incidentally, the following (1) to (3) will be described later.

(1) Main member portion 30
(2) Pressing portion 40
(3) Coil spring 50 (urging device)

(Main Member Portion 30)

As shown in FIG. 1, FIG. 2, FIG. 4, and FIG. 7, the main member portion 30 includes an opening portion 31 on a front face. There, the "front face" corresponds to a right side in FIG. 7 as an example, and is also called a "front side". A left side in the same drawing is a "back face" side, is closed by the later-described back wall 60, and is also called a "back side".

As shown in FIG. 1 to FIG. 7, the main member portion 30 is formed in a box type, roughly includes the following respective portions, and is integrally formed of a thermoplastic resin having appropriate rigidity, for example, "POM" (polyacetal or polyoxymethylene).

Incidentally, the following (1) and (2) will be described later.

(1) Back wall 60
(2) Outside wall 70

Incidentally, as a material of the main member portion 30, although the "POM" is shown as an example, it is not limited to the above, and other resin materials may be used, or the main member portion 30 may be made of metal.

(Pressing Portion 40)

Figure 2:
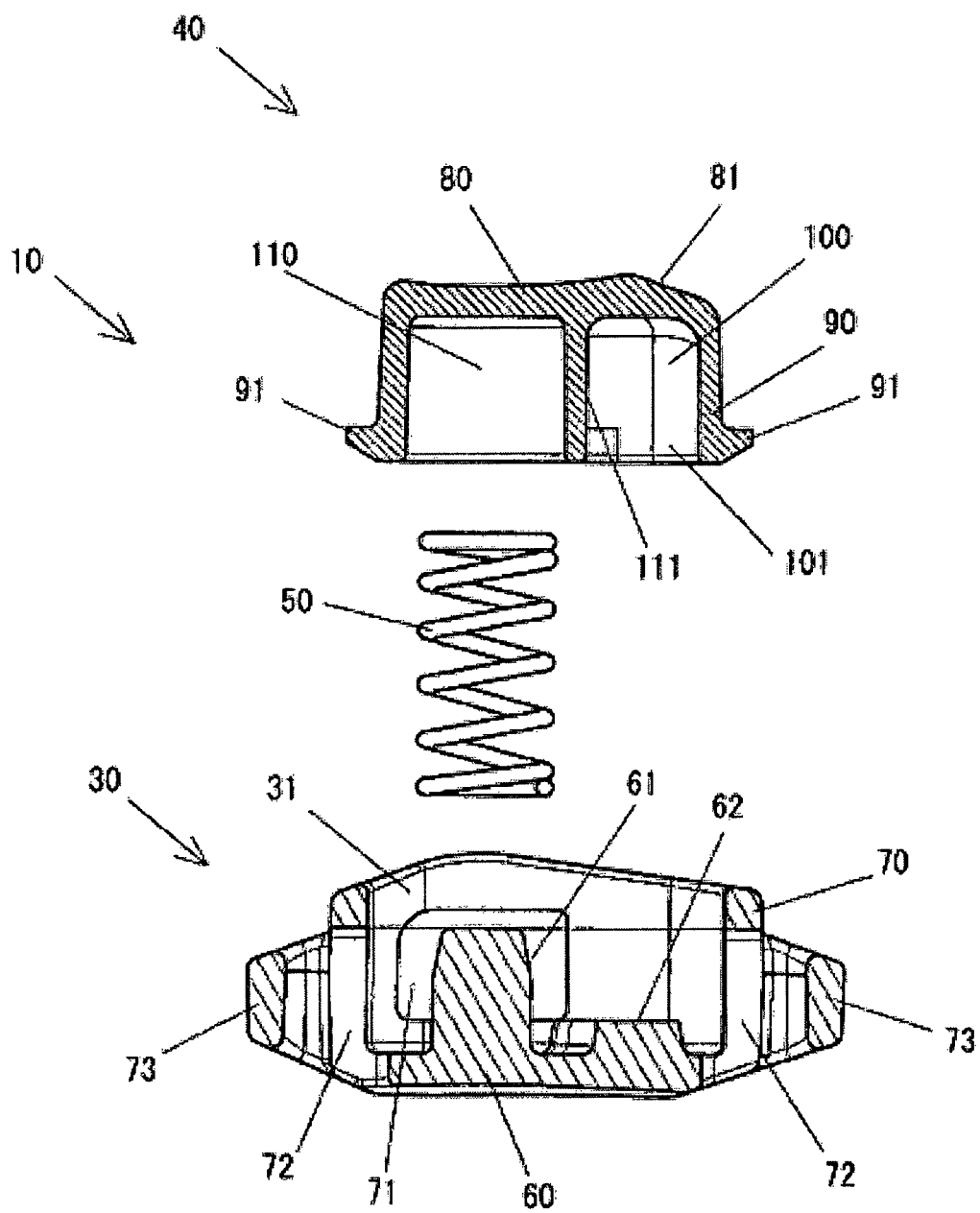
FIG. 2 is an exploded cross-sectional view of the cord lock.
Figure 15:
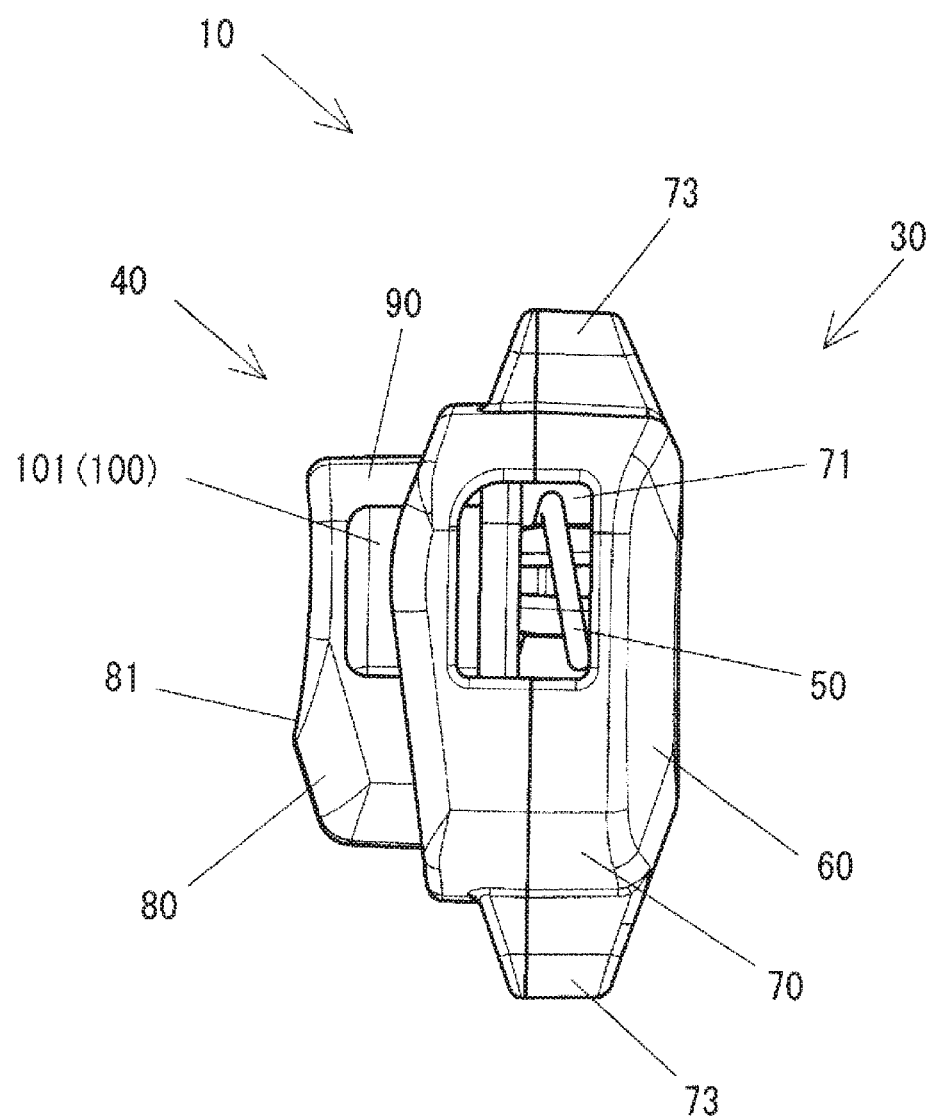
FIG. 15 is a front view of the cord lock in an assembled state.
Figure 16:
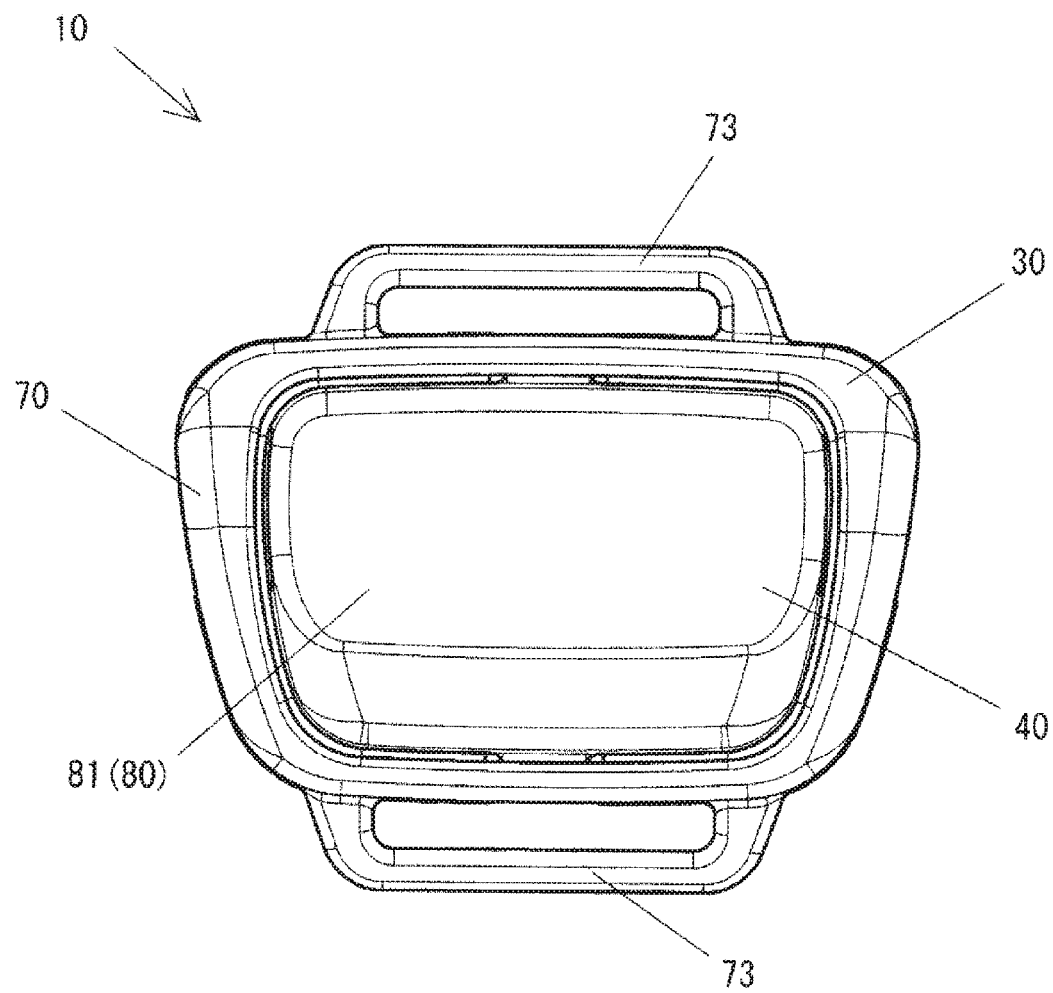
FIG. 16 is a left side view of the cord lock in the assembled state.

As shown in FIG. 2 and FIG. 15, the pressing portion 40 is housed movably in a front-and-back direction inside the main member portion 30.

As shown in FIG. 1, FIG. 2, and FIG. 8 to FIG. 11, the pressing portion 40 roughly includes the following respective portions, and in the same manner as the main member portion 30, the pressing portion 40 is integrally formed of a thermoplastic resin having elasticity in addition to the appropriate rigidity, for example, the "POM" (polyacetal or polyoxymethylene).

Incidentally, the following (1) to (4) will be described later.

(1) Front wall 80
(2) Inside wall 90
(3) Pressing-portion string insertion portion 100
(4) Cylinder concave portion 110

Incidentally, as a material of the pressing portion 40, although the "POM" is shown as an example, it is not limited to the above, and in the same manner as the main member portion 30, the other resin materials may be used, or the pressing portion 40 may be made of metal. Also, although the material of the pressing portion 40 and the material of the main member portion 30 are the same, they may be different.

(Coil Spring 50)

As shown in FIG. 2 and FIG. 15, the coil spring 50 is located between the main member portion 30 and the pressing portion 40, is for urging the pressing portion 40 to a front of the main member portion 30, and functions as the "urging device".

Figure 14:
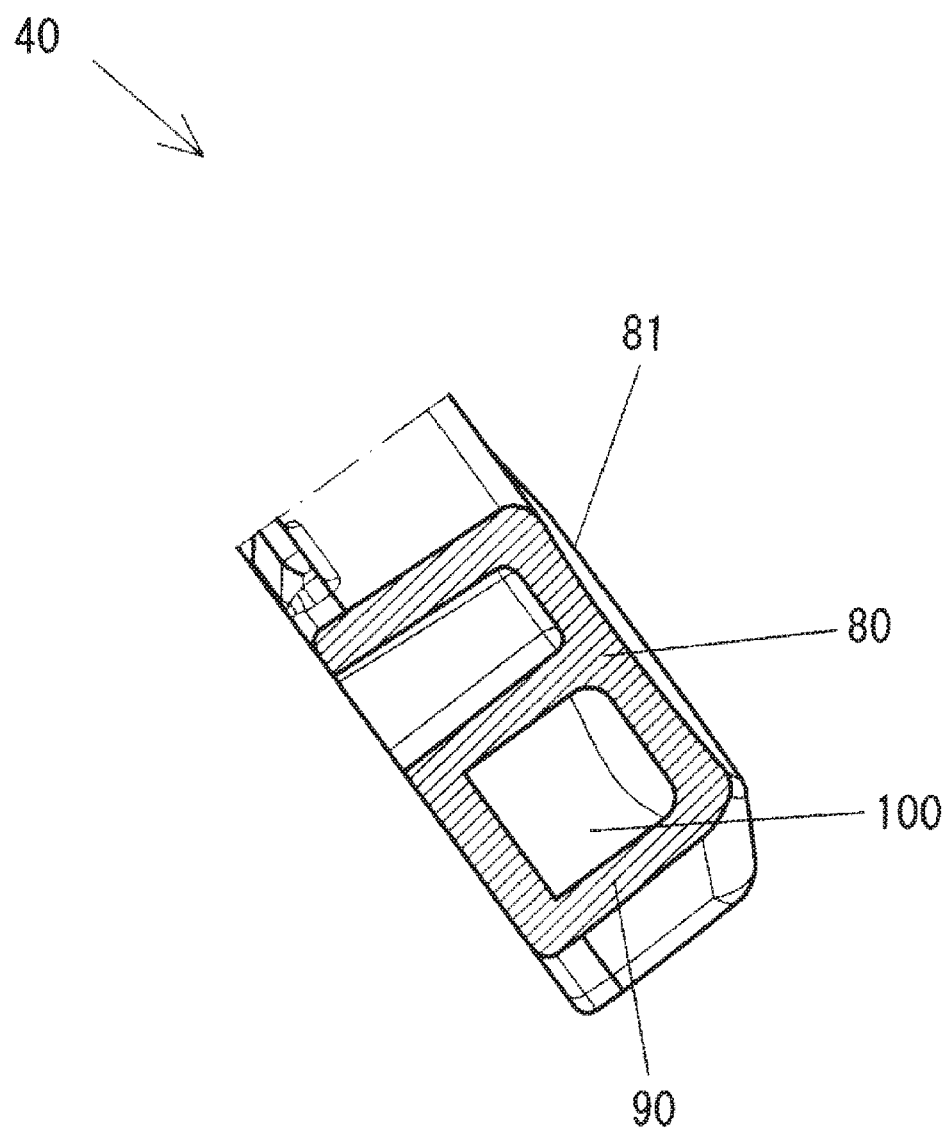
FIG. 14 is a cross-sectional view taken along a line D-D in FIG. 10 of the pressing portion.

As shown in FIG. 1, FIG. 2, and FIG. 14, the coil spring is located at a position wrapping a virtual three-dimensional shape obtained by connecting, with straight lines, two imaginary faces on which an inner face of a side wall, i.e., the later-described inside wall 90 of the pressing portion 40, and an outer shape of the string member 20 passing through the later-described two main-member-portion holes 71 intersect.

There, to explain briefly, the "two imaginary faces on which an inner face of a side wall, and an outer shape of the string member 20 passing through the two main-member-portion holes 71 intersect" corresponds to a rectangular hole face of the later-described pressing-portion holes 101 shown in FIG. 1.

As shown in FIG. 1 and FIG. 2, the coil spring 50 is housed in the later-described cylinder concave portion 110 provided in the pressing portion 40, and is compressed by a bottom of the cylinder concave portion 110 and the later-described back wall 60 of the main member portion 30.

Incidentally, as the urging device, although the coil spring 50 is shown as an example, it is not limited to the above, and for example, a leaf spring and a cushion member may be used. Also, the urging device is not limited to be made of metal, and may be a resin spring, and the resin spring may be integrally formed on one of the main member portion 30 or the pressing portion 40, or both the main member portion 30 and the pressing portion 40.

(Back Wall 60)

Figure 7:
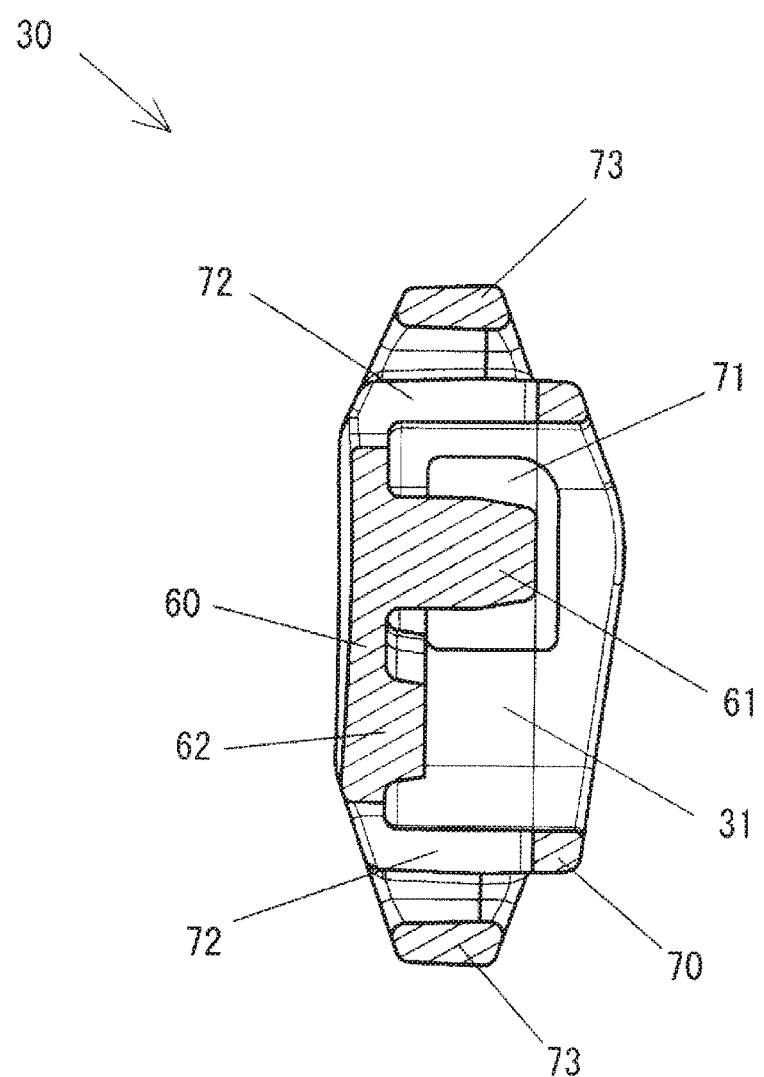
FIG. 7 is a cross-sectional view taken along a line A-A in FIG. 4 of the main member portion.

As shown in FIG. 7, the back wall 60 closes a face on an opposite side facing the opening portion 31, i.e., a back face. As shown in FIG. 7, the back wall 60 has an approximately rectangular shape wherein a flat surface thereof is long to right and left, or an approximately trapezoidal shape wherein a lower side thereof is narrowed, and is formed in a plate shape.

Incidentally, as a flat surface shape of the back wall 60, although the approximately rectangular shape or the approximately trapezoidal shape is shown as an example, it is not limited to the above, and may have a triangle, a polygon equal to or more than a pentagon, an oval, an ellipse, or a shape in which a character such as an animal, a flower, or the like is disposed.

As shown in FIG. 1, FIG. 2 to FIG. 4, and FIG. 7, the back wall 60 roughly includes the following respective portions.

(1) Boss Portion 61

Figure 3:
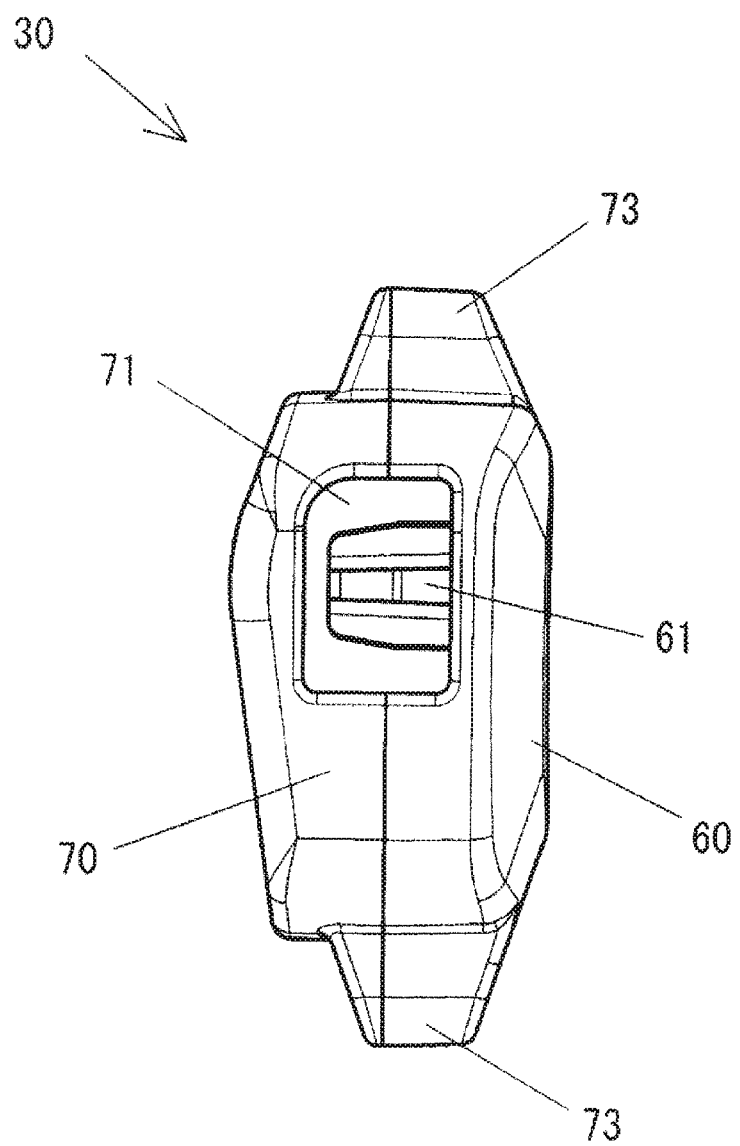
FIG. 3 is a front view of a main member portion of the cord lock.
Figure 4:
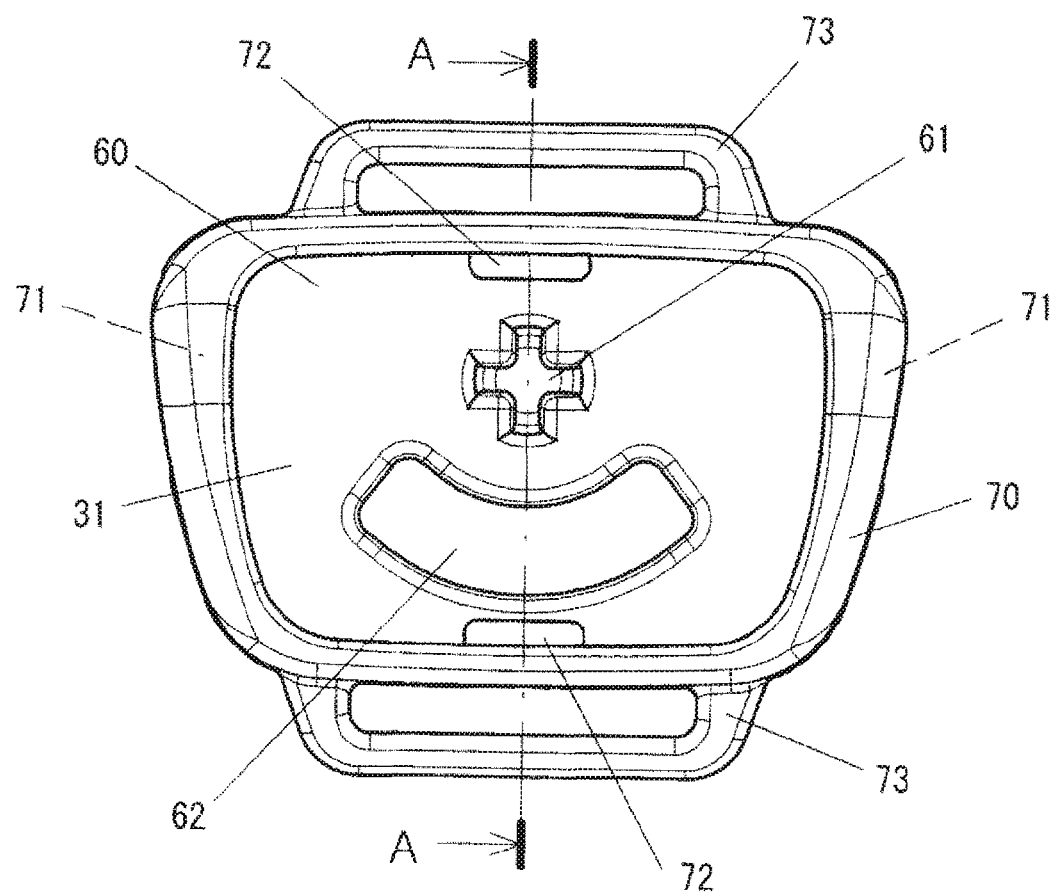
FIG. 4 is a left side view of the main member portion.

As shown in FIG. 7, the boss portion 61 extends toward the opening portion 31 from the back wall 60, and one end portion of the coil spring 50 fits externally. As shown in FIG. 3, FIG. 4, and FIG. 7, the boss portion 61 is located on an imaginary line connecting the later-described two main-member-portion holes 71 of the outside wall 70, and a center thereof is located at a middle point on the imaginary line.

(2) Protrusion Portion 62

As shown in FIG. 7, the protrusion portion 62 protrudes toward the opening portion 31 from the back wall 60, and as shown in FIG. 4, a flat surface of the protrusion portion 62 is formed in an arc shape around the boss portion 61. The protrusion portion 62 is located to face the later-described pressing-portion string insertion portion 100 of the pressing portion 40. As shown in FIG. 7, the protrusion portion 62 is formed at a shifted position, unlike the boss portion 61, relative to the imaginary line connecting the later-described two main-member-portion holes 71 of the outside wall 70.

(Outside Wall 70)

As shown in FIG. 1 to FIG. 4, FIG. 6, and FIG. 7, the outside wall 70 is formed in a frame shape bordering a circumference of the back wall 60.

As shown in FIG. 3 to FIG. 7, the outside wall 70 roughly comprises the following respective portions.

(1) Main-Member-Portion Holes 71

As shown in FIG. 3, FIG. 4, FIG. 7, and FIG. 18, the main-member-portion holes 71 are formed at two portions of the side wall forming the opening portion 31, i.e., the outside wall 70 of the main member portion 30 for passing the string member 20 through. The main-member-portion holes 71 pass through an inside and outside of the outside wall 70, are formed in an approximately rectangular shape, and as shown in FIG. 4, the main-member-portion holes 71 are formed to be linearly symmetrical on both right and left sides by sandwiching the boss portion 61.

(2) Slide Grooves 72

In the slide grooves 72, although it is not shown in the drawings, there are fitted the later-described slide projections 91 of the pressing portion 40 so as to control a movement of the pressing portion 40 in the front-and-back direction. As shown in FIG. 7, the slide grooves 72 pass through the inside and outside of the outside wall 70, and are formed in a groove shape long in a right-and-left direction in the same drawing. In the slide groove 72, an opening portion 31 side is formed to be a dead end at the outside wall 70 so as to control a maximum projecting position of the pressing portion 40, and to prevent the pressing portion 40 from coming out of the opening portion 31.

As shown in FIG. 7, a pair of slide grooves 72 is formed above and below the outside wall 70.

(3) String Passing Frames 73

Figure 5:
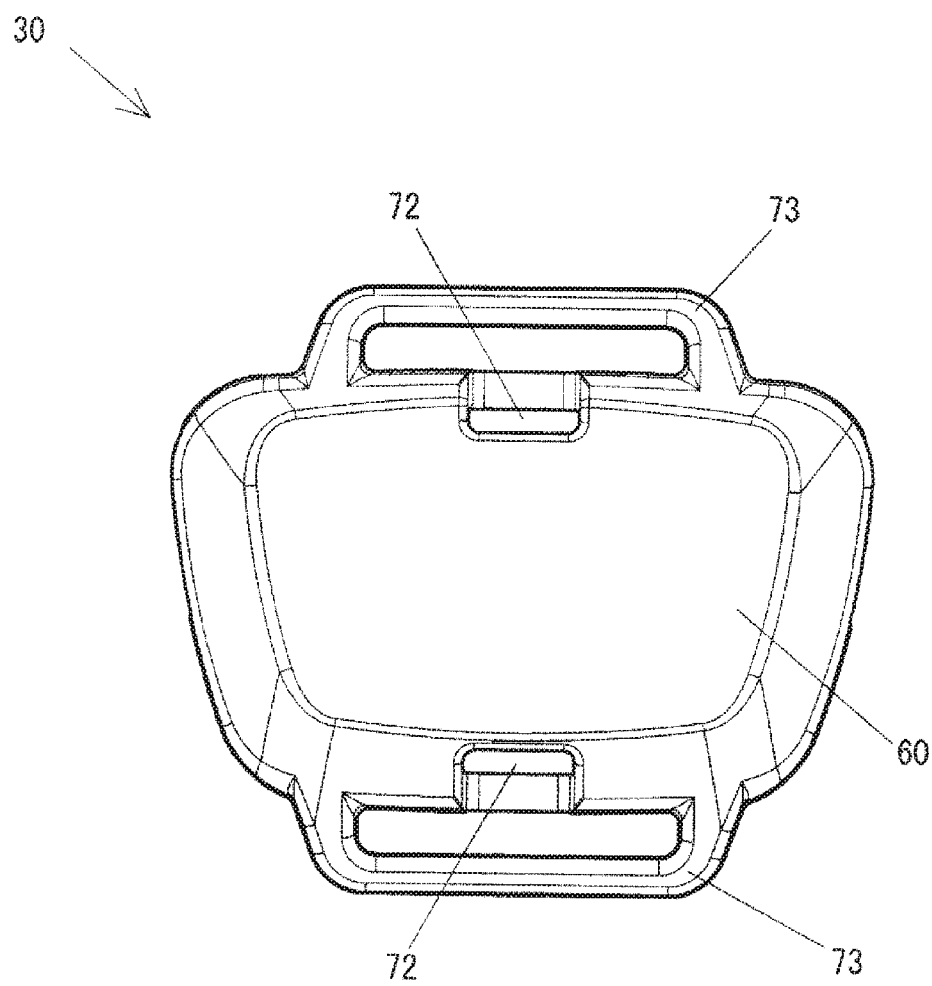
FIG. 5 is a right side view of the main member portion.
Figure 6:
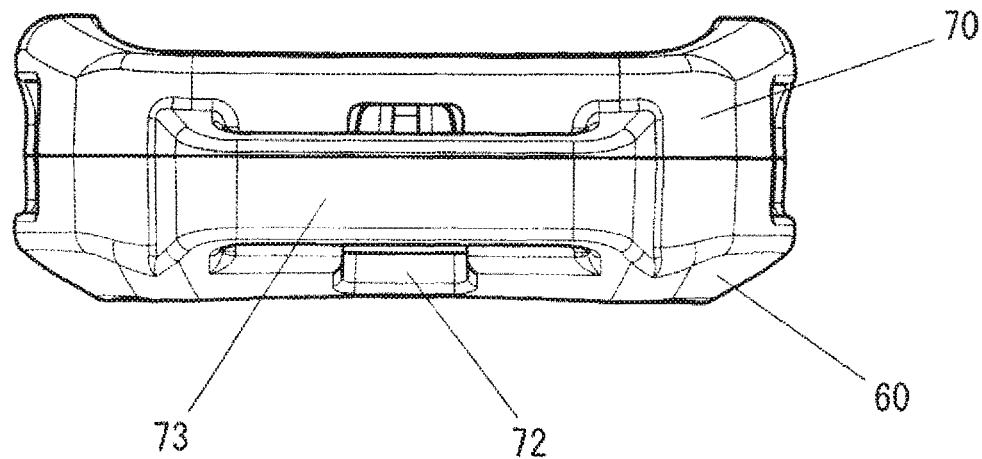
FIG. 6 is a bottom view of the main member portion.

As shown in FIG. 4 and FIG. 5, the string passing frames 73 are located outside the slide grooves 72, and project in an approximately U shape from the outside wall 70.

A pair of string passing frames 73 is formed above and below the outside wall 70.

In the string passing frames 73, although it is not shown in the drawings, a wide belt member in addition to the string member 20 can pass through or can be fixed.

Incidentally, although the pair of string passing frames 73 is provided, it is not limited to the above, and for example, all of the pair of string passing frames 73 may be omitted, or only one string passing frame 73 may be provided, or three or more string passing frames 73 may be provided. Although the string passing frames 73 are provided above and below, they are not limited to the above, and may be provided in the right-and-left direction.

(Front Wall 80)

Figure 8:
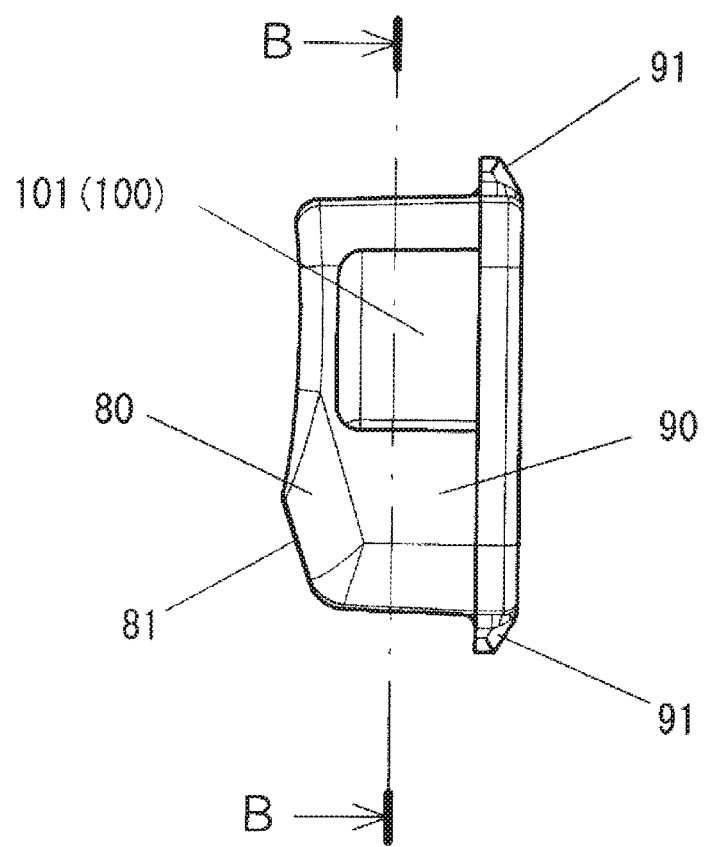
FIG. 8 is a front view of a pressing portion of the cord lock.
Figure 9:
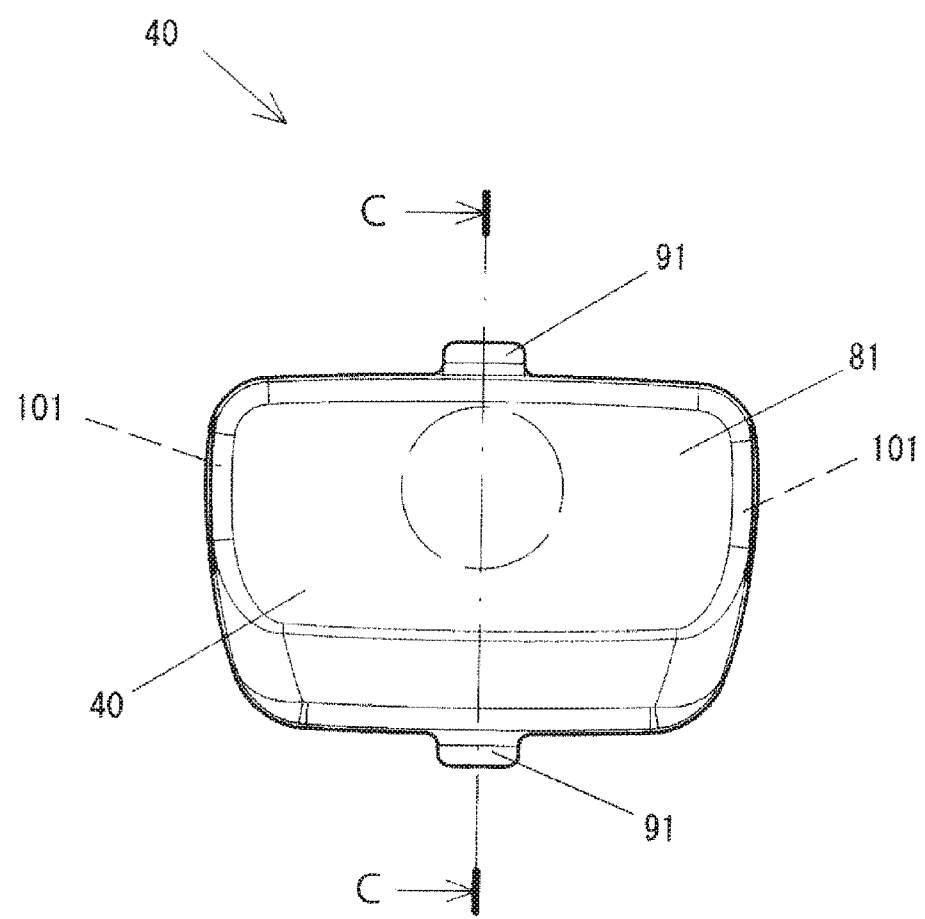
FIG. 9 is a left side view of the pressing portion.

As shown in FIG. 8 and FIG. 15, the front wall 80 includes a pressing face 81 on a front face, and an outer shape thereof is set to have an inner shape of the opening portion 31 of the main member portion 30 equal or less.

(Inside Wall 90)

As shown in FIG. 8, and FIGS. 10 to 14, the inside wall 90 projects in a thickness direction of the front wall 80.

On an outer face of the inside wall 90, there is provided slide projections 91 projecting outwardly in a claw shape.

Figure 13:
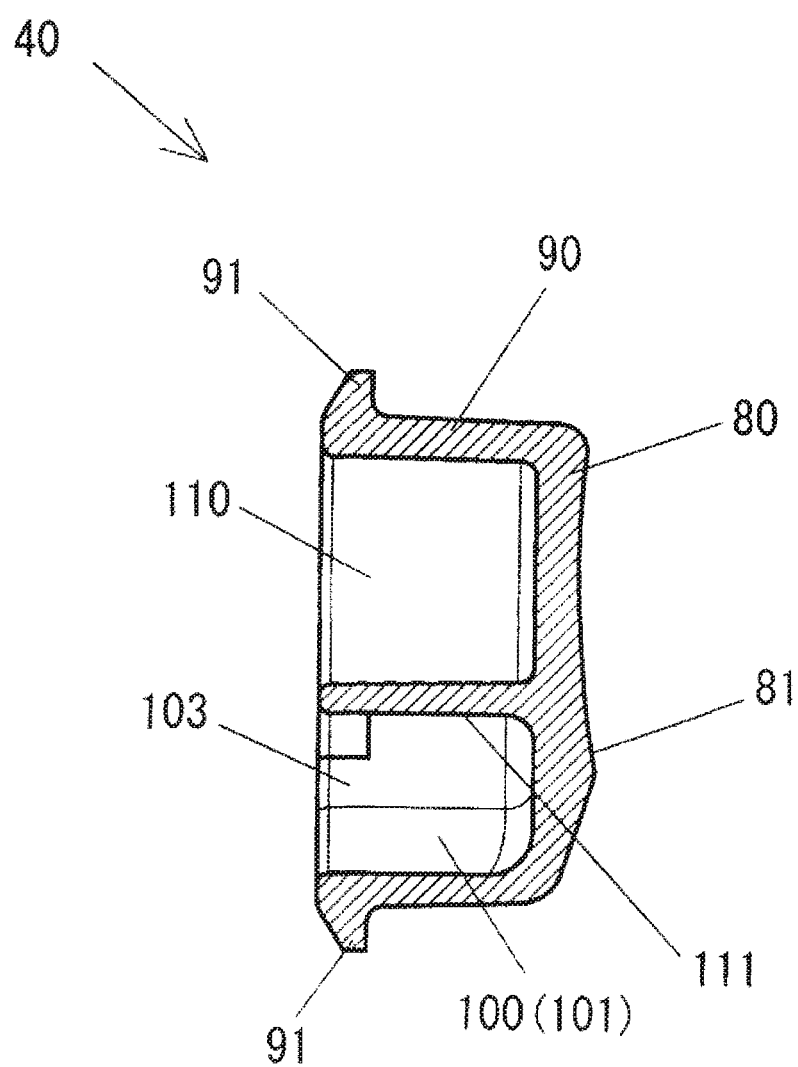
FIG. 13 is a cross-sectional view taken along a line C-C in FIG. 9 of the pressing portion.

As shown in FIG. 13, the slide projections 91 are located on a back side of the inside wall 90, and on a left side in the same drawing, and a pair of slide projections 91 is formed above and below the inside wall 90. The slide projections 91 fit into the pair of slide grooves 72 of the main member portion 30 respectively, and when the pressing portion 40 moves in the front-and-back direction, the slide projections 91 move along the slide grooves 72.

(Pressing-Portion String Insertion Portion 100)

Figure 12:
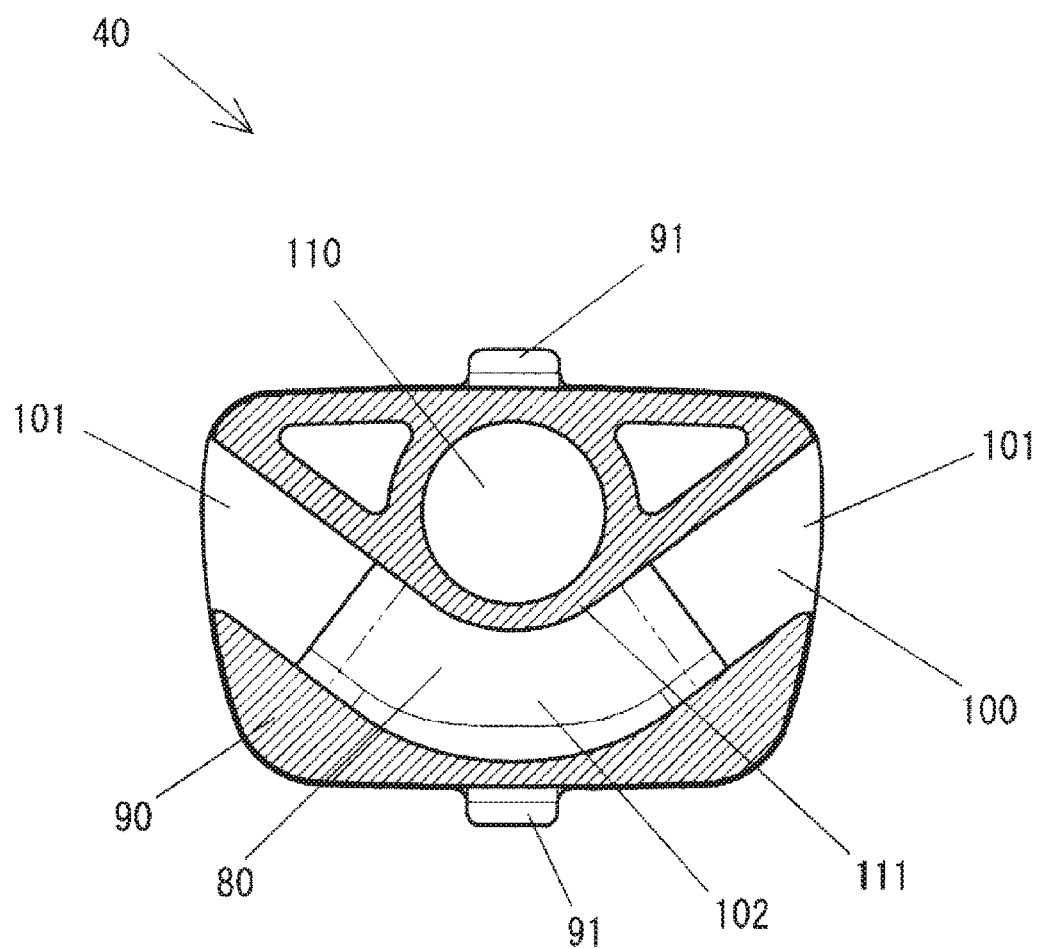
FIG. 12 is a cross-sectional view taken along a line B-B in FIG. 8 of the pressing portion.
Figure 17:
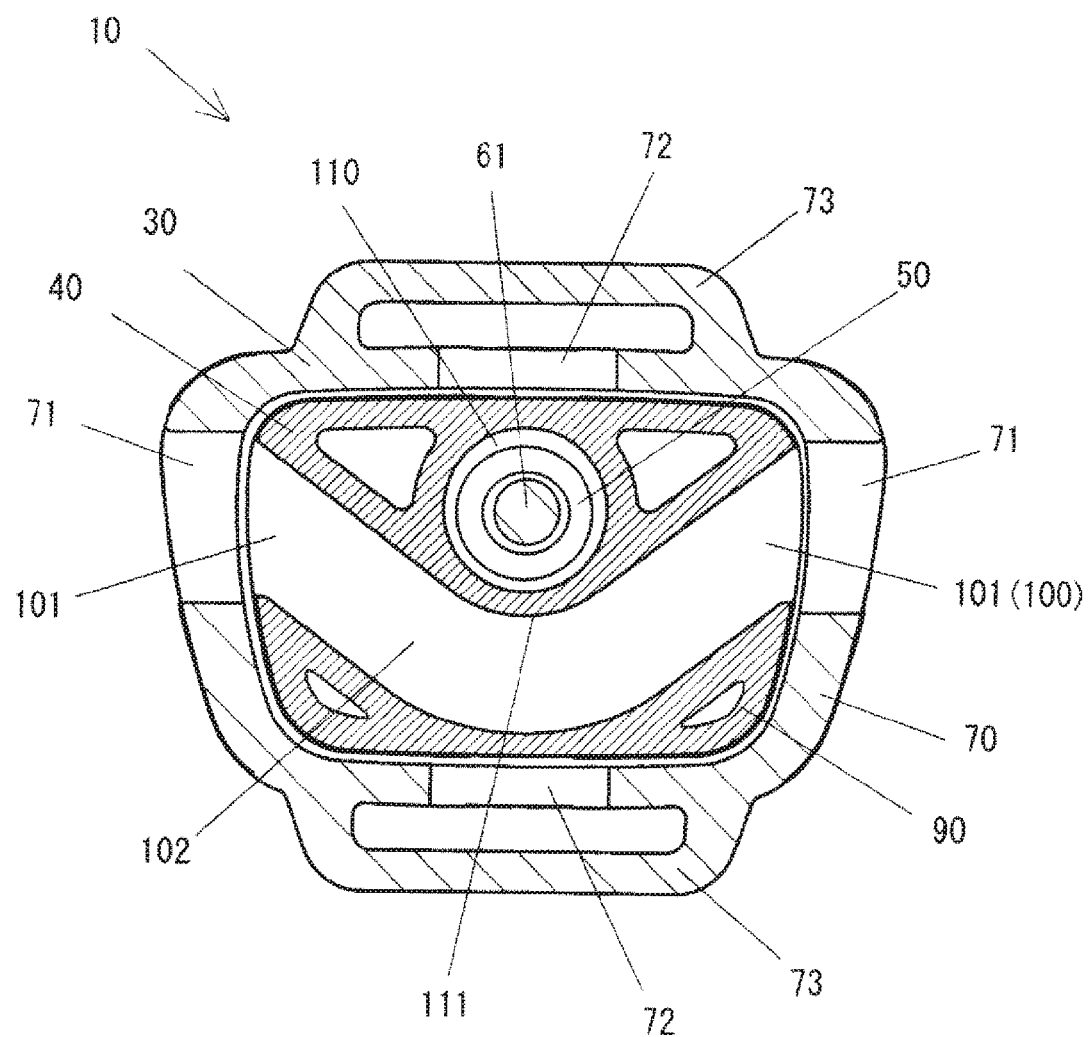
FIG. 17 is a vertical cross-sectional view of the cord lock shown in FIG. 15.

As shown in FIG. 17, the pressing-portion string insertion portion 100 is located inside the pressing portion 40, can communicate with the two main-member-portion holes 71 of the main member portion 30, and is for passing the string member 20. As shown in FIG. 12, the pressing-portion string insertion portion 100 is formed in a groove shape through which the string member 20 passes.

As shown in FIG. 8, FIG. 10, and FIG. 12 to FIG. 14, the pressing-portion string insertion portion 100 roughly includes the following respective portions. Incidentally, the following (1) to (3) will be described later.

(1) Pressing-portion holes 101
(2) Bend insertion portion 102
(3) Window portion 103

(Cylinder Concave Portion 110)

Figure 10:
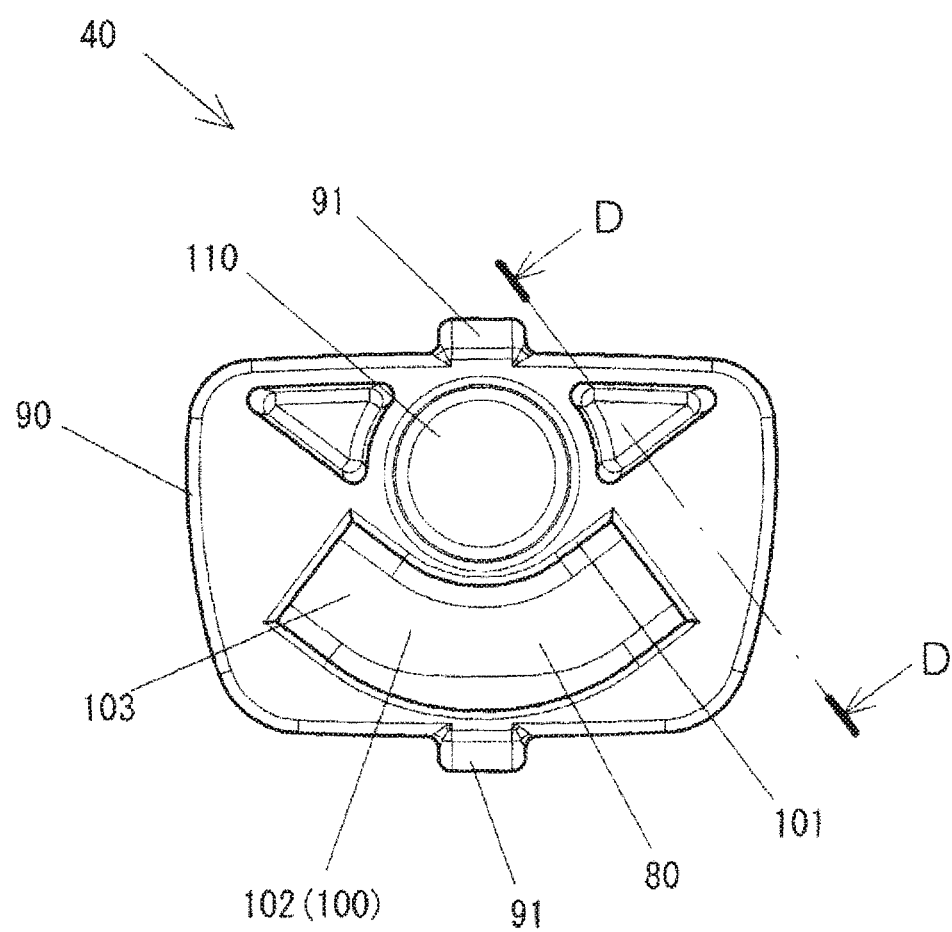
FIG. 10 is a right side view of the pressing portion.
Figure 11:
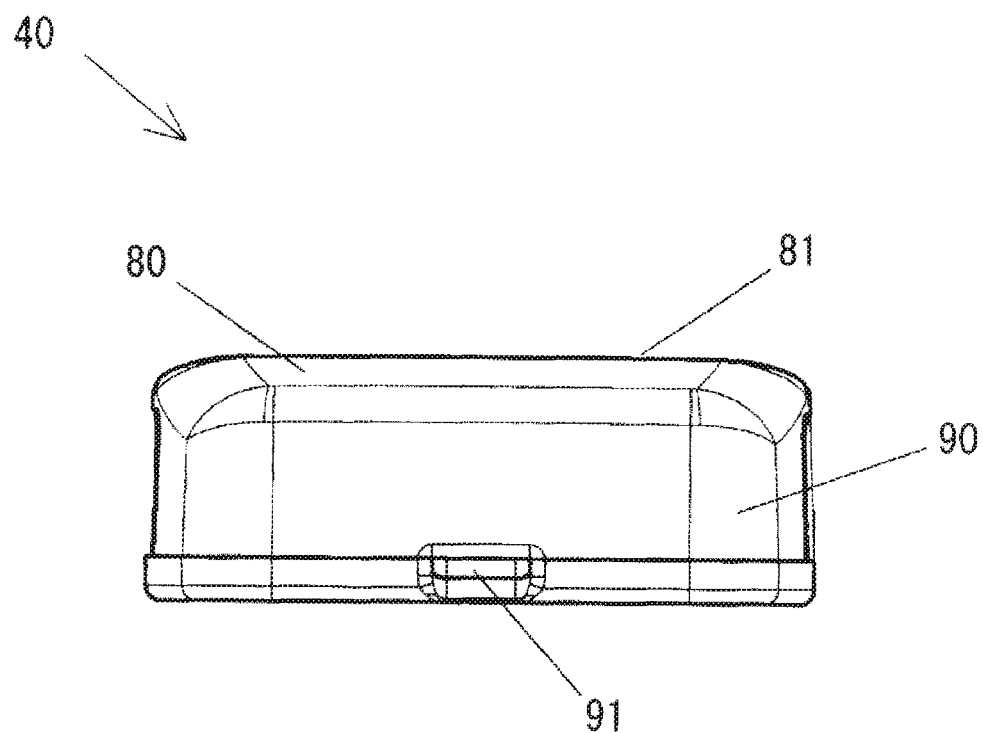
FIG. 11 is a bottom view of the pressing portion.

As shown in FIG. 10, FIG. 12, and FIG. 13, the cylinder concave portion 110 is formed in a concave shape having a cylinder shape, and a back side, i.e., the left side in FIG. 13 opens, and the coil spring 50 is housed from the opening. As shown in FIG. 17, in the cylinder concave portion 110, there is fitted the boss portion 61 of the main member portion 30 from the opening thereof.

As shown in FIG. 12, in the cylinder concave portion 110, there is formed a peripheral wall 111 protruding in an arc shape toward the pressing-portion string insertion portion 100, and the peripheral wall 111 is provided so that the later-described bend insertion portion 102 passes.

Figure 18:
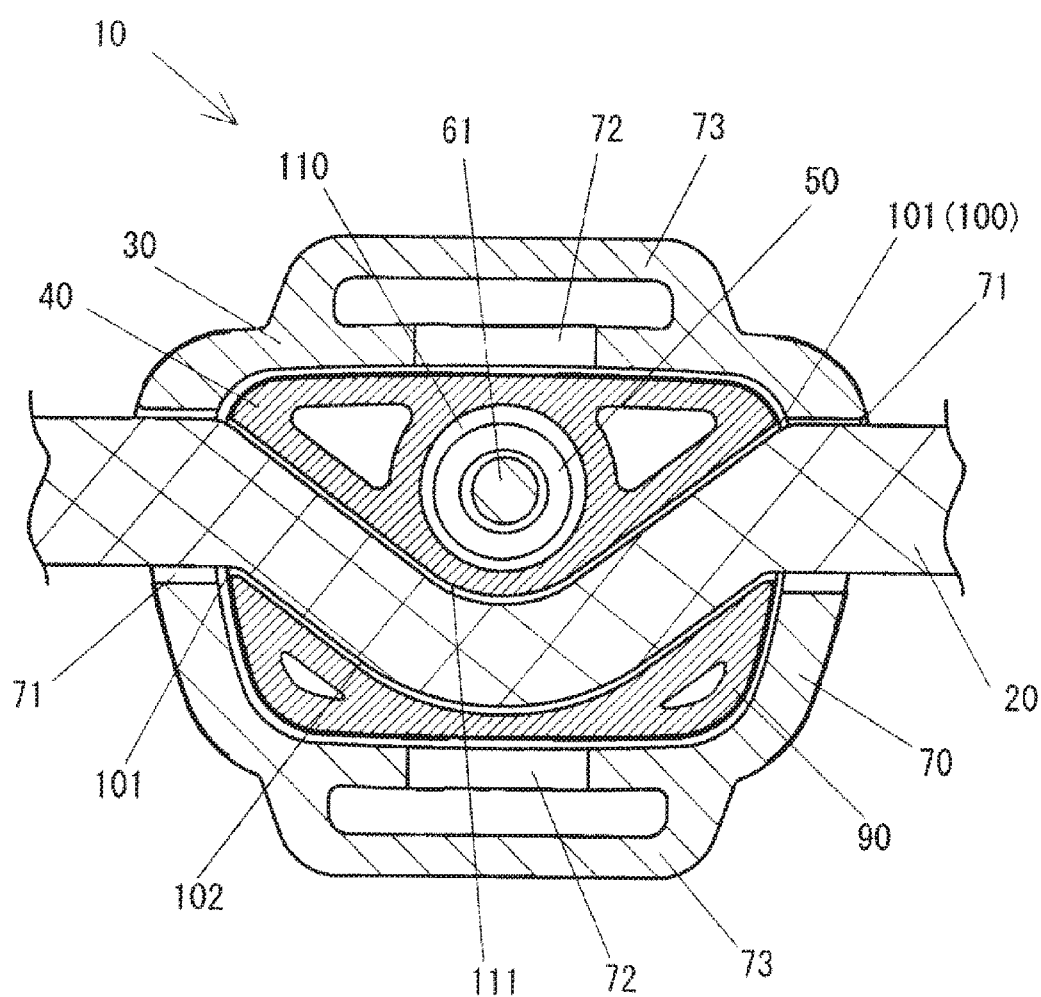

Consequently, as shown in FIG. 18, the string member 20 passing the pressing-portion string insertion portion 100 is located by sandwiching the coil spring 50 housed inside the cylinder concave portion 110 and the peripheral wall 111, so that not only the string member 20 can easily pass the pressing-portion string insertion portion 100, and the string member 20 can easily move, but also there is an advantage that the string member 20 can be prevented from biting into a gap of the coil spring 50 beforehand.

(Pressing-Portion Holes 101)

As shown in FIG. 8 and FIG. 12, the pressing-portion holes 101 are located at both end portions of the pressing-portion string insertion portion 100, and as shown in FIG. 17, in an assembled state wherein the pressing portion 40 is inserted from the opening portion 31 of the main member portion 30, the pressing-portion holes 101 are disposed at a substantially same position as the two main-member-portion holes 71. The pressing-portion holes 101 of the pressing portion 40 shown in FIG. 17 correspond to "two openings of the pressing-portion string insertion portion" in a fourth mode. The pressing-portion holes 101 pass through an inside and outside of the inside wall 90, are formed in an approximately rectangular shape substantially the same as the main-member-portion holes 71, and are formed to be linearly symmetrical on both right and left sides by sandwiching the cylinder concave portion 110.

(Bend Insertion Portion 102)

As shown in FIG. 12, the bend insertion portion 102 is located in a middle of the pressing-portion string insertion portion 100, and as shown in FIG. 17 and FIG. 18, the bend insertion portion 102 is for inserting the string member 20 to pass through by bending the string member 20 inside the pressing portion 40. As shown in FIG. 12, the bend insertion portion 102 is provided in such a way so as to pass the peripheral wall 111 of the cylinder concave portion 110. The bend insertion portion 102 connects the two pressing-portion holes 101, and is formed in an arc shape in such a way so as to go half around the cylinder concave portion 110.

As shown in FIG. 12, the bend insertion portion 102 inserts the string member 20 to pass through outside an imaginary line connecting between hole edges on a same side of the two main-member-portion holes 71.

There, the "hole edges on a same side of the two main-member-portion holes 71" correspond to hole edges of the "pressing-portion holes 101" of the pressing portion 40 as shown in FIG. 12.

(Window Portion 103)

As shown in FIG. 1, FIG. 2, FIG. 10, and FIG. 13, the window portion 103 is formed by opening one portion on an opposite face side of the pressing face 81 of the pressing portion 40 in the bend insertion portion 102. The window portion 103 shown in FIG. 13 corresponds to a portion "formed by opening one portion on an opposite face side of the pressing face (81) of the pressing portion (40) in the bend insertion portion (102)" in a fifth mode.

The window portion 103 is formed in an arc shape along the bend insertion portion 102. By forming the window portion 103, the bend insertion portion 102 of the pressing portion 40 can be easily formed at a molding time.

(Use Method of the Cord Lock 10)

Next, a use method of the cord lock 10 in an assembled state will be explained.

As shown in FIG. 15, the pressing portion 40 protrudes from the opening portion 31 of the main member portion 30 by a spring force of the coil spring 50 before use, and at that time, the main-member-portion hole 71 of the main member portion 30 and the pressing-portion hole 101 of the pressing portion 40 are alternately shifted in the front-and-back direction, i.e., the right-and-left direction in FIG. 15 to be positioned.

Although it is not shown in the drawings, when the string member 20 passes through, the pressing face 81 of the pressing portion 40 is pushed in toward the opening portion 31 of the main member portion 30 against the spring force of the coil spring 50.

As shown in FIG. 17, when the pressing portion 40 is pushed in, positions of the main-member-portion hole 71 and the pressing-portion hole 101 match, so that the main-member-portion hole 71 and the pressing-portion string insertion portion 100 communicate.

In a state wherein the pressing portion 40 is pushed in, as shown in FIG. 18, a tip portion of the string member 20 is inserted into the pressing-portion string insertion portion 100 from one of the two main-member-portion holes 71. When the string member 20 is inserted, the string member 20 bends in the arc shape along the bend insertion portion 102, and after that, the string member 20 comes out of the other main-member-portion hole 71.

After passing the string member 20, when a force pushing the pressing portion 40 is released, by the spring force of the coil spring 50, in the same manner as a case before the use, the pressing portion 40 moves forward in a direction of protruding from the opening portion 31 of the main member portion 30. Consequently, the main-member-portion hole 71 and the pressing-portion hole 101 attempt to be shifted alternately in the front-and-back direction, i.e., the right-and-left direction in FIG. 15, so that the string member 20 is locked inside the cord lock 10 so as to prevent a movement of the string member 20.

Incidentally, when a length of the string member 20 is adjusted, a lock state is released by pushing the pressing portion 40, so that the string member 20 can relatively move relative to the cord lock 10.

Figure 19:
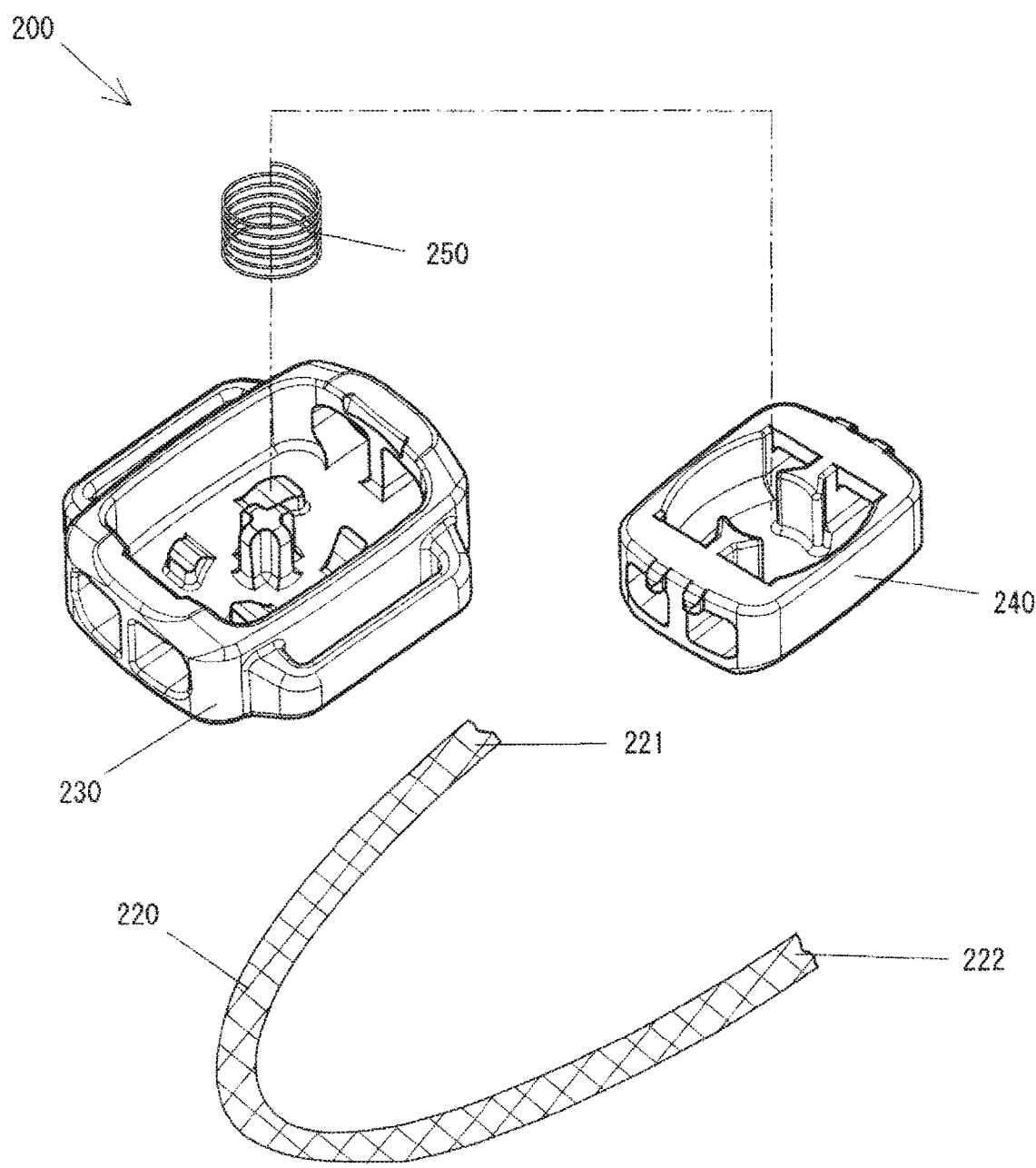
FIG. 19 is an exploded perspective view of the cord lock according to a second embodiment of the present invention.
Figure 20:
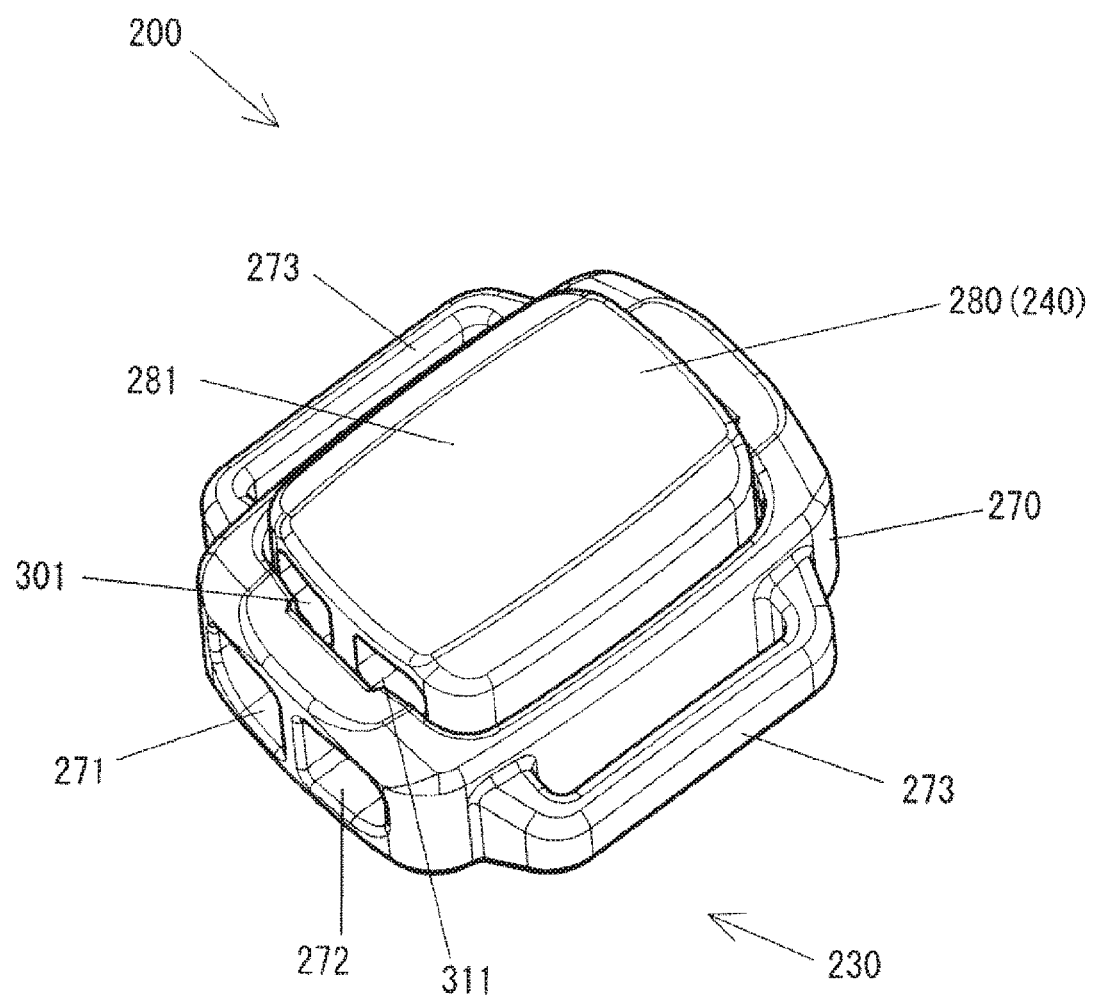
FIG. 20 is a perspective view of the cord lock in the assembled state.
Figure 21:
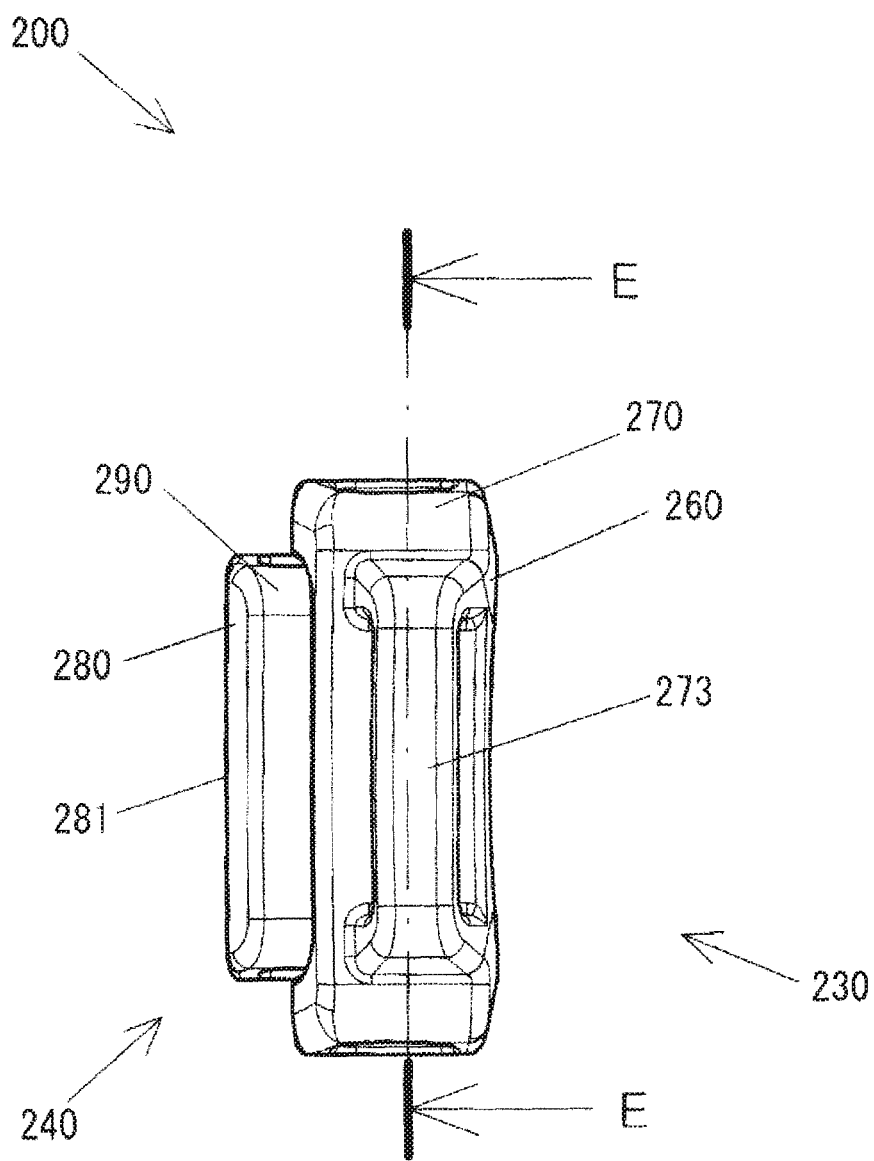
FIG. 21 is a front view of the cord lock shown in FIG. 20.
Figure 22:
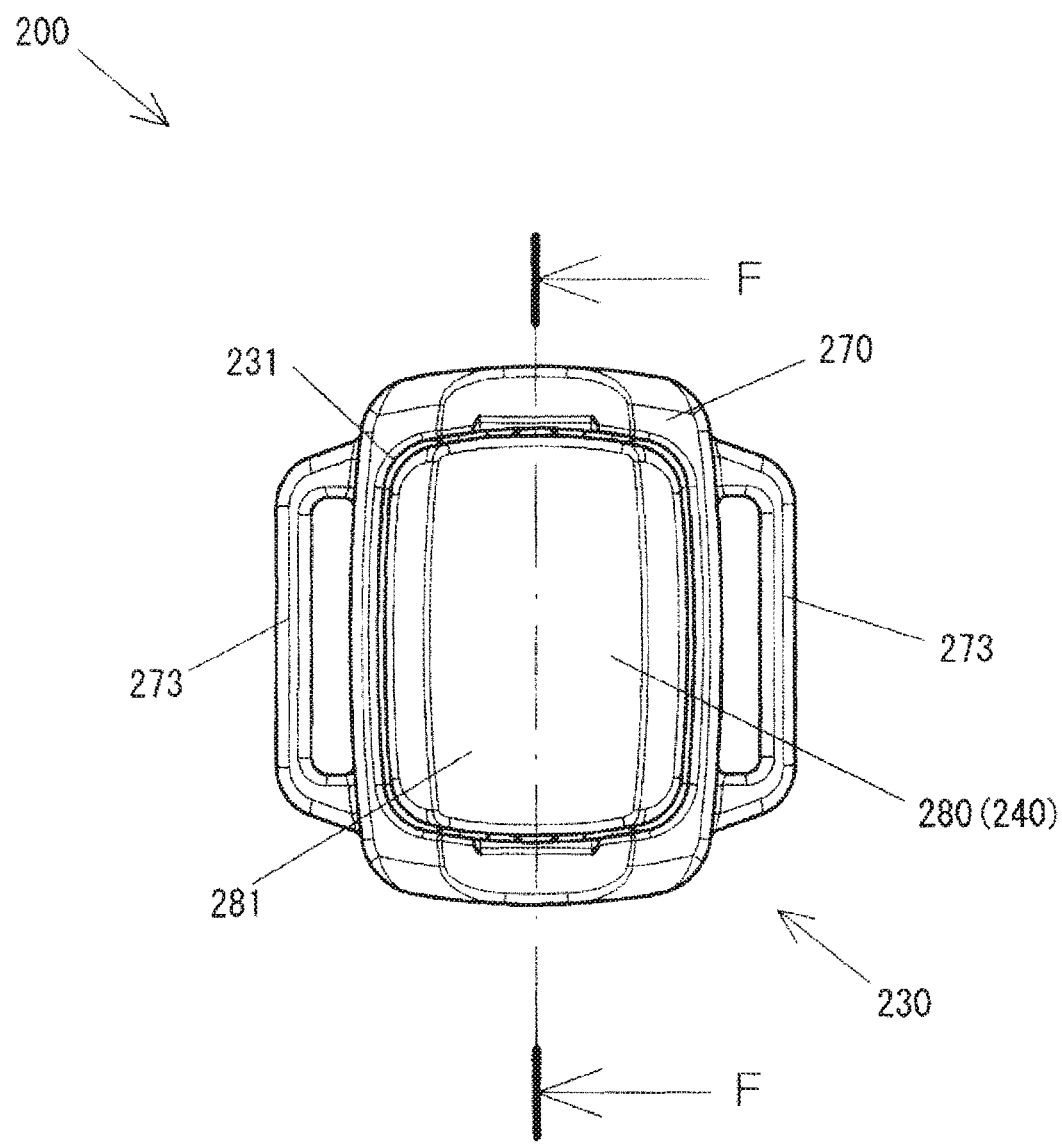
FIG. 22 is a left side view of the cord lock shown in FIG. 21.

(Explanation of the Cord Lock According to a Second Embodiment of the Present Invention with FIG. 19 and Subsequent Figures)

Next, with FIG. 19 to FIG. 37, the second embodiment of the invention will be explained.

Figure 25:
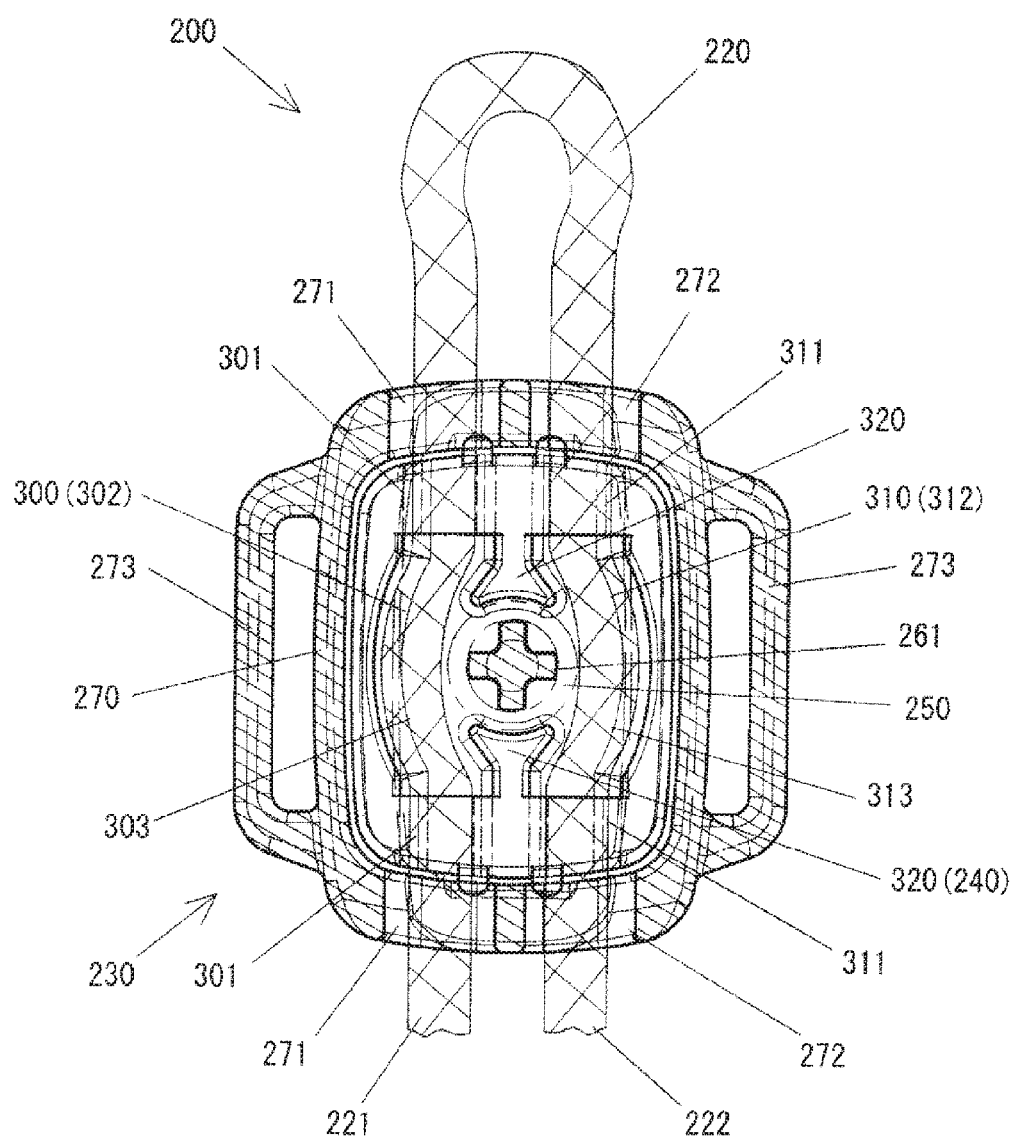

In the characteristics of the present embodiment, at first, although it is not shown in the drawings, two string members 220, or as shown in FIG. 19 and FIG. 25, two both end portions 221 and 222 can pass by looping the string member 220.

Secondly, in the characteristics of the present embodiment, by omitting the peripheral wall 111 of the cylinder concave portion 110 in the first embodiment explained previously with FIG. 1 to FIG. 18, two both end portions 221 and 222 can be disposed in a proximity manner as shown in FIG. 25, and a width in the right-and-left direction in the same drawing can be reduced.

As shown in FIG. 19, a cord lock 200 according to the present embodiment comprises roughly the following structure. Incidentally, respective portions of the following (1) to (3) will be described later.

(1) Main member portion 230
(2) Pressing portion 240
(3) Coil spring 250

(Main Member Portion 230)

As shown in FIG. 25, the main member portion 230 basically includes a structure similar to the main member portion 30 of the first embodiment explained previously other than that the string member 220 can pass the two first and second end portions 221 and 222 by looping the string member 220 so as to omit a detailed explanation.

As shown in FIG. 27 to FIG. 31, the main member portion 230 comprises roughly the following respective portions. Incidentally, the respective portions of the following (1) to (3) will be described later.

(1) Opening portion 231
(2) Back wall 260
(3) Outside wall 270

(Pressing Portion 240)

The pressing portion 240 includes basically a structure similar to the pressing portion 40 of the first embodiment previously explained so as to omit the detailed explanation.

As shown in FIG. 32 to FIG. 37, the pressing portion 240 comprises roughly the following respective portions. Incidentally, the respective portions of the following (1) to (4) will be described later.

(1) Front wall 280
(2) Inside wall 290
(3) First and second pressing-portion string insertion portions 300 and 310
(4) Branch portions 320

(Coil Spring 250)

As shown in FIG. 19, the coil spring 250 is located between the main member portion 230 and the pressing portion 240, is for urging the pressing portion 240 to a front of the main member portion 230, and functions as the "urging device".

Also, the coil spring 250 can prevent the string member 220 from biting into a gap of the coil spring 250 beforehand by reducing a pitch compared to the coil spring 50 of the first embodiment previously explained.

Incidentally, as the urging device, although the coil spring 250 has been explained as an example, it is not limited to the above, and for example, the leaf spring, and the cushion member may be used, or the urging device is not limited to be made of the metal, and may be made of the resin spring, and the resin spring may be integrally formed in one of the main member portion 230 or the pressing portion 240, or both the main member portion 230 and the pressing portion 240.

(Opening Portion 231)

Figure 27:
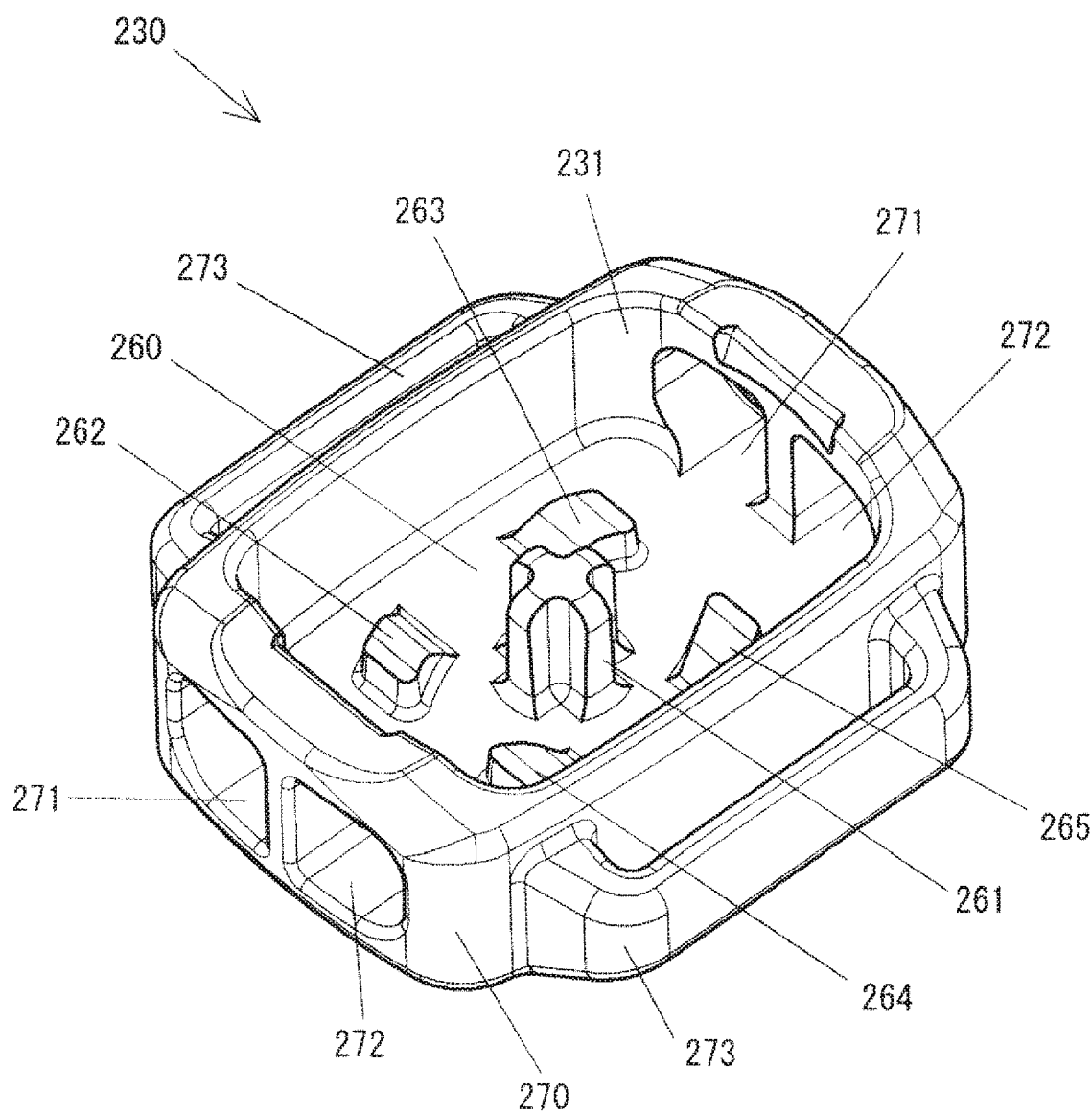
FIG. 27 is a perspective view of the main member portion of the cord lock.
Figure 28:
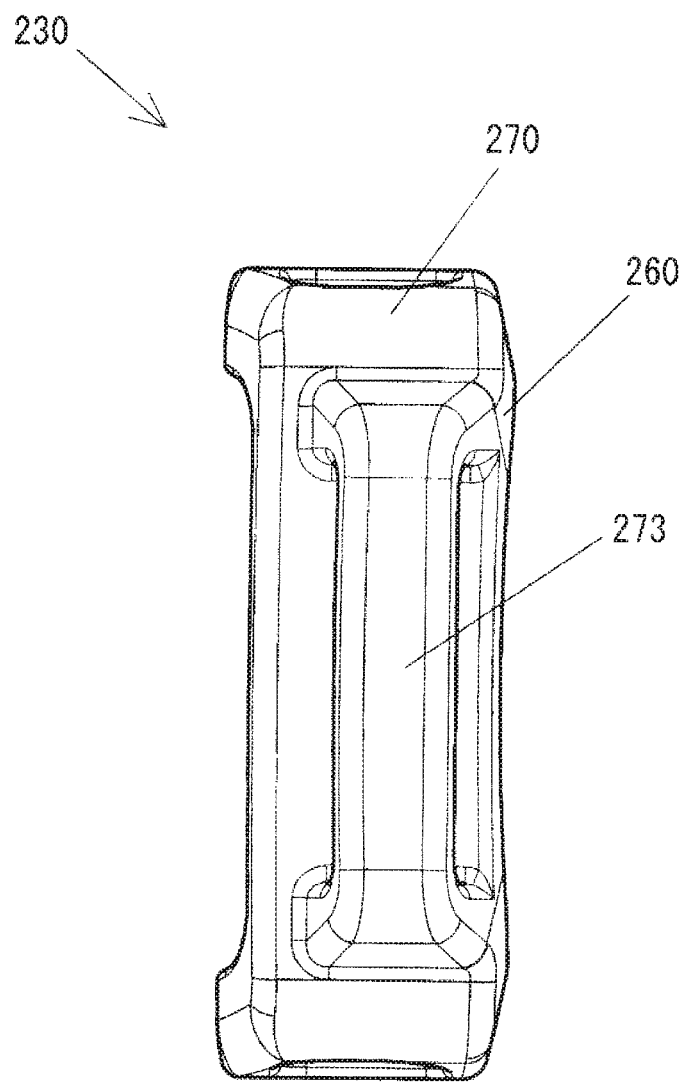
FIG. 28 is a front view of the main member portion shown in FIG. 27.

The opening portion 231 opens on the front face of the main member portion 30, i.e., in FIG. 27, upwardly.

(Back Wall 260)

The back wall 260 includes basically a structure similar to the back wall 60 of the first embodiment previously explained so as to omit the detailed explanation.

Figure 26:
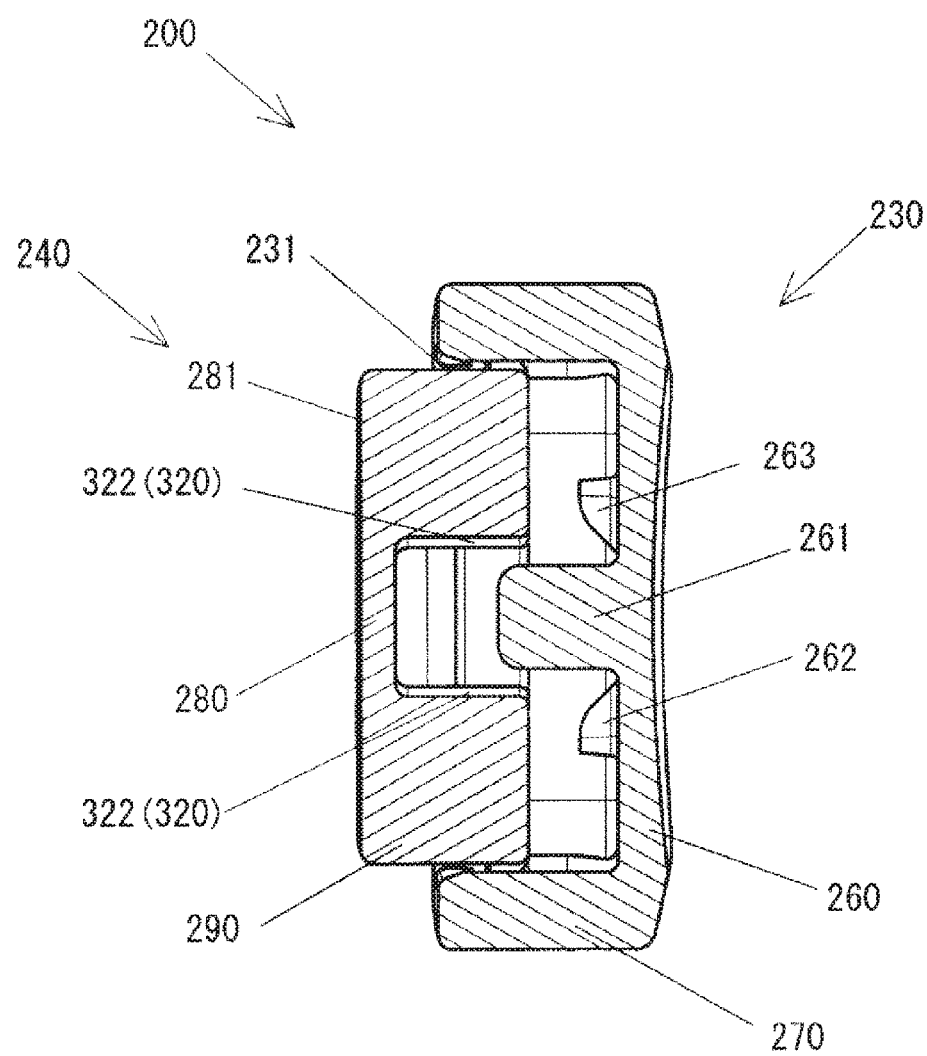
FIG. 26 is a cross-sectional view taken along a line F-F in FIG. 22 of the cord lock.
Figure 29:
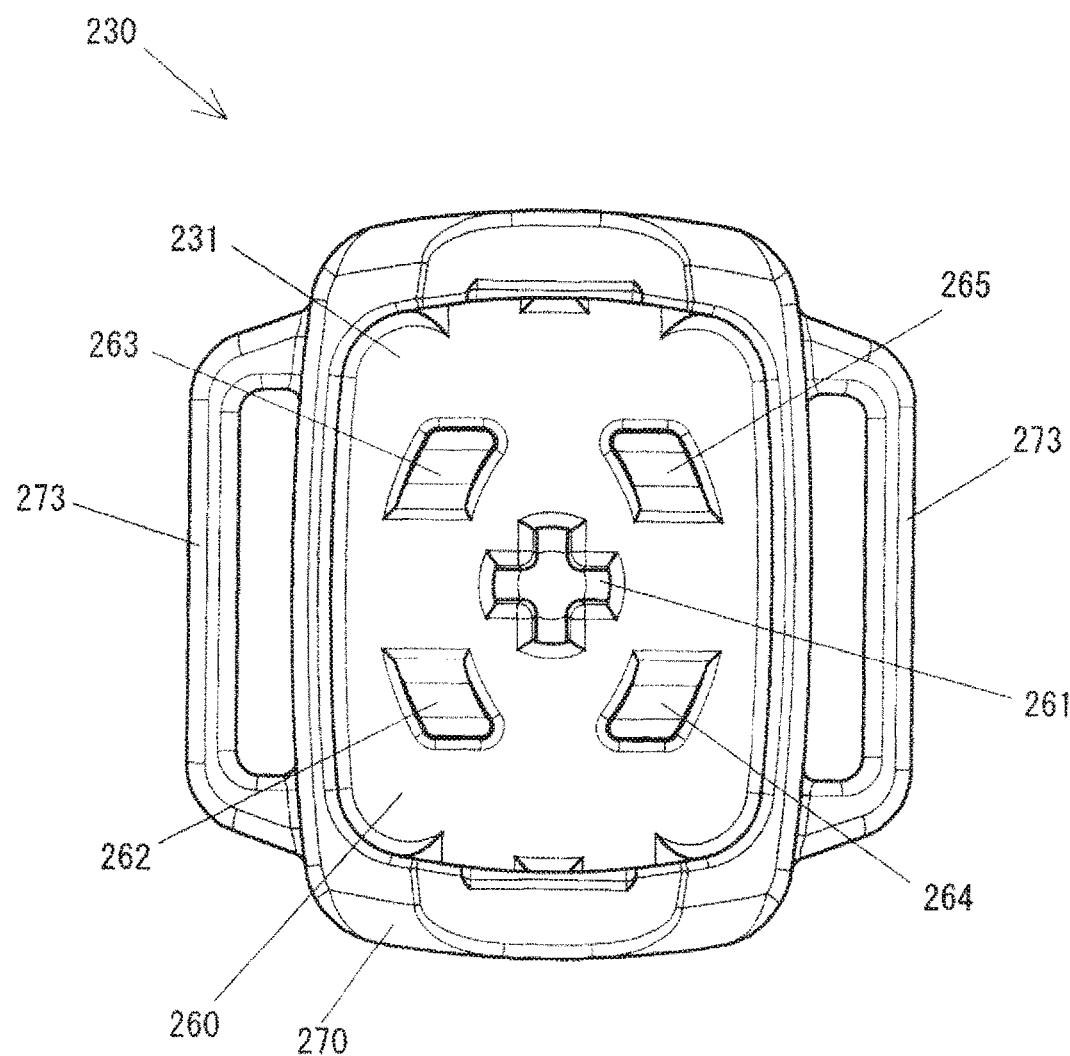
FIG. 29 is a left side view of the main member portion shown in FIG. 28.

As shown in FIG. 26, FIG. 27, and FIG. 29, the back wall 260 roughly comprises the following respective portions.

(1) Boss Portion 261

As shown in FIG. 27 and FIG. 29, the boss portion 261 is located at a center of an inner face of the back wall 260, and extends toward the opening portion 231, and one end portion of the coil spring 250 fits externally.

(2) First Protrusion Portions 262 and 263

As shown in FIG. 26, FIG. 27, and FIG. 29, the first protrusion portions 262 and 263 protrude toward the opening portion 231 from the back wall 260, and are located along the later-described first pressing-portion string insertion portion 300 of the pressing portion 240.

As shown in FIG. 29, the first protrusion portions 262 and 263 are formed as a pair, and a flat surface thereof inclines in an inverted v shape toward the later-described two first main-member-portion holes 271 of the outside wall 270. As shown in FIG. 26, the two first protrusion portions 262 and 263 are formed in an approximately trapezoid shape in cross section facing a slope face in a direction of facing each other.

(3) Second Protrusion Portions 264 and 265

As shown in FIG. 29, the second protrusion portions 264 and 265 are formed to be linearly symmetrical to the first protrusion portions 262 and 263 by sandwiching the boss portion 261, and are located along the later-described second pressing-portion string insertion portion 310 of the pressing portion 240.

(Outside Wall 270)

The outside wall 270 includes basically a structure similar to the outside wall 70 of the first embodiment previously explained so as to omit the detailed explanation.

As shown in FIG. 27, the outside wall 270 roughly comprises the following respective portions.

(1) First Main-Member-Portion Holes 271

Figure 31:
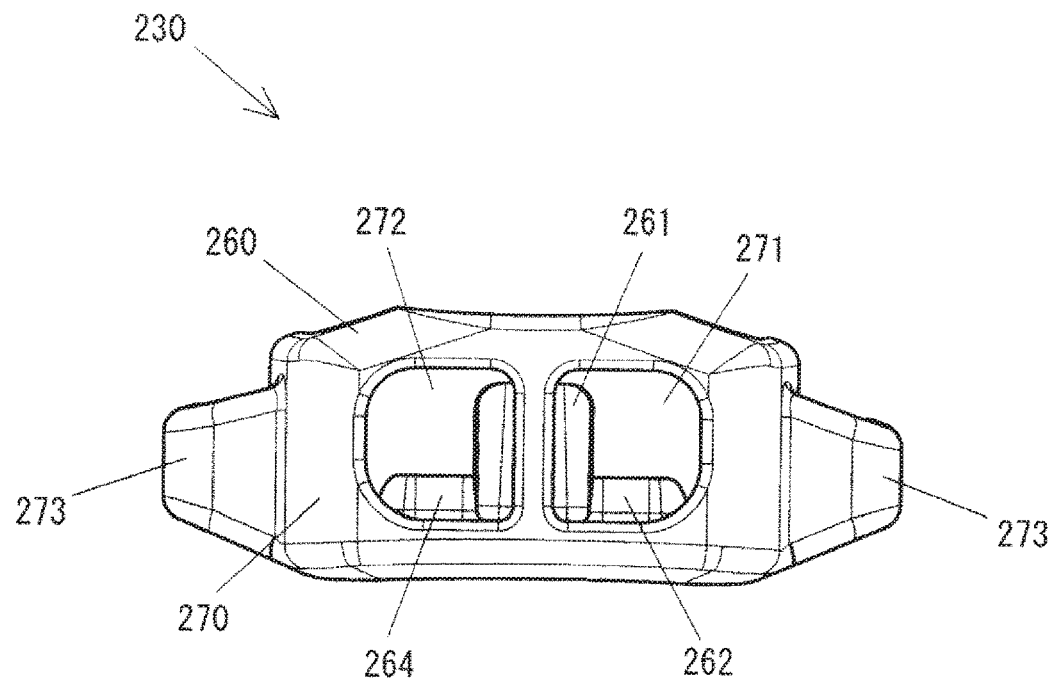
FIG. 31 is a bottom view of the main member portion shown in FIG. 28.

As shown in FIG. 27 and FIG. 31, the first main-member-portion holes 271 are formed at two portions of the outside wall 270 by facing each other, and the first end portion 221 of the string member 220 passes therethrough.

(2) Second Main-Member-Portion Holes 272

As shown in FIG. 27 and FIG. 31, the second main-member-portion holes 272 are located adjacent to the first main-member-portion holes 271, and are formed at two portions of the outside wall 270 by facing each other, and the second end portion 222 of the string member 220 passes therethrough.

(3) String Passing Frames 273

Figure 30:
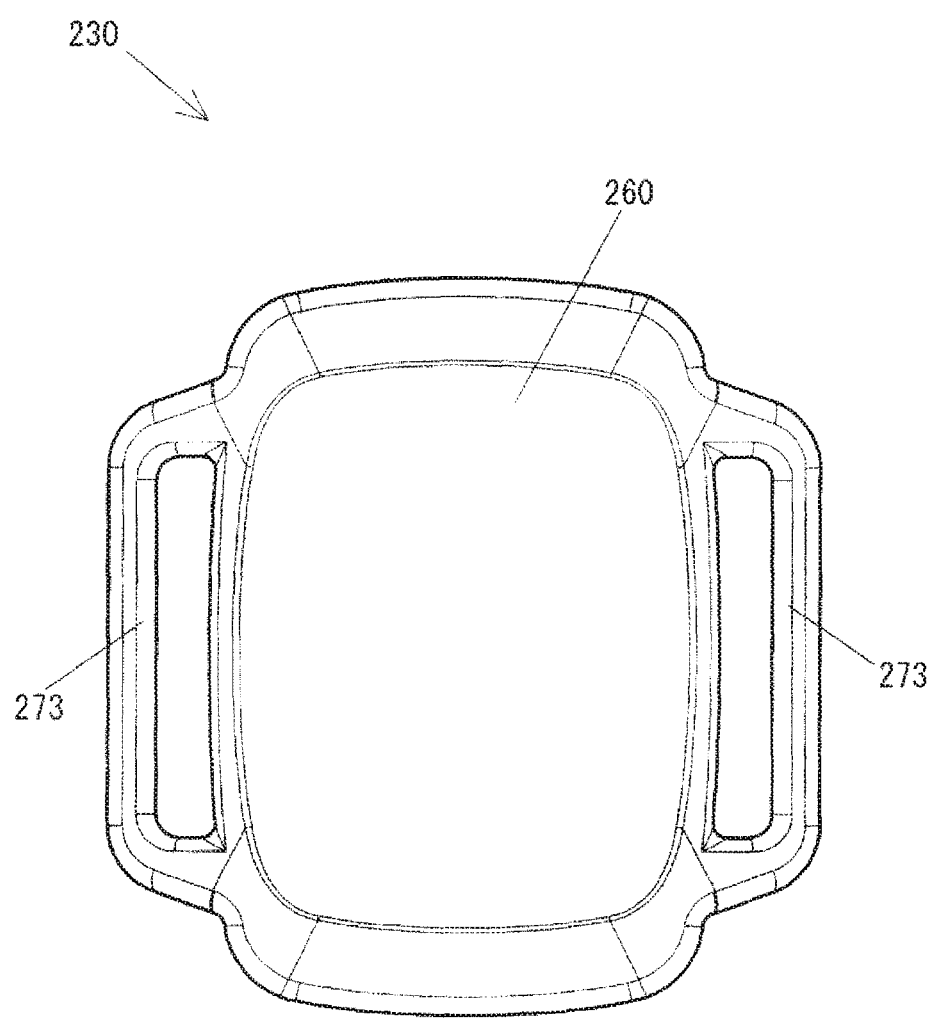
FIG. 30 is a right side view of the main member portion shown in FIG. 28.

As shown in FIG. 27 to FIG. 31, the string passing frames 273 project in the approximately U shape from the outside wall 270. In FIG. 29 and FIG. 30, the string passing frames 273 are located in the right-and-left direction of the outside wall 70, and are formed as a pair.

In the string passing frames 273, although it is not shown in the drawings, the wide belt member in addition to the string member 220 can pass through or can be fixed.

(Front Wall 280)

The front wall 280 includes basically a structure similar to the front wall 80 of the first embodiment previously explained so as to omit the detailed explanation.

Figure 32:
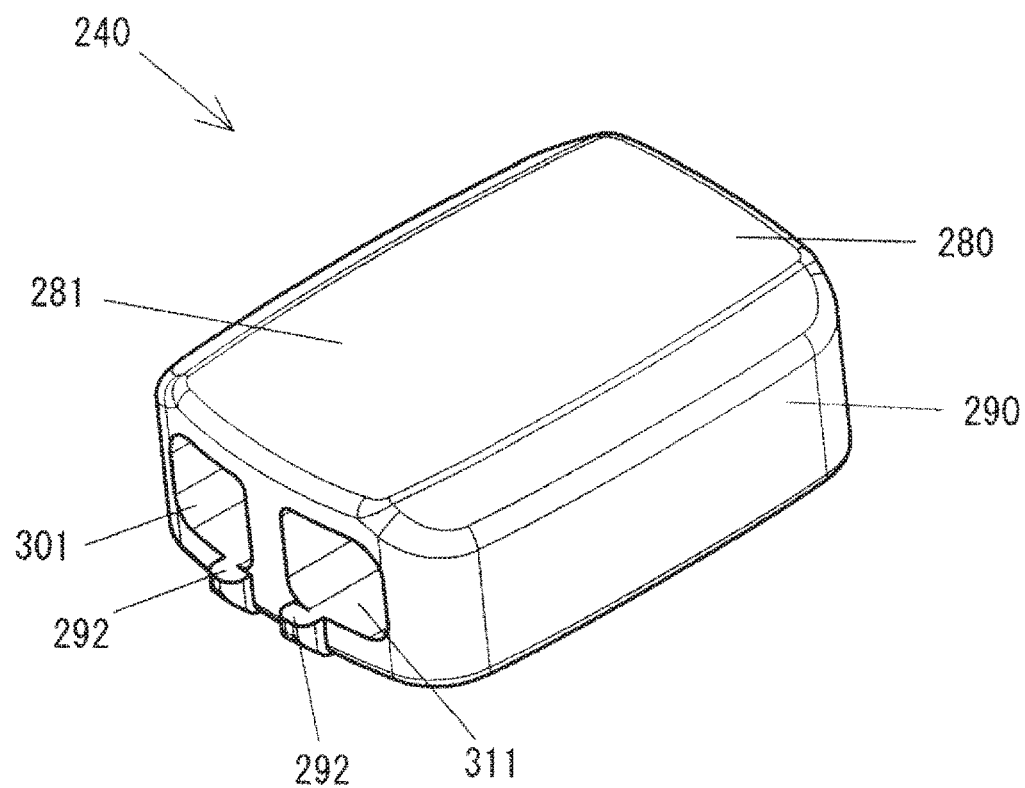
FIG. 32 is a perspective view of the pressing portion of the cord lock.
Figure 34:
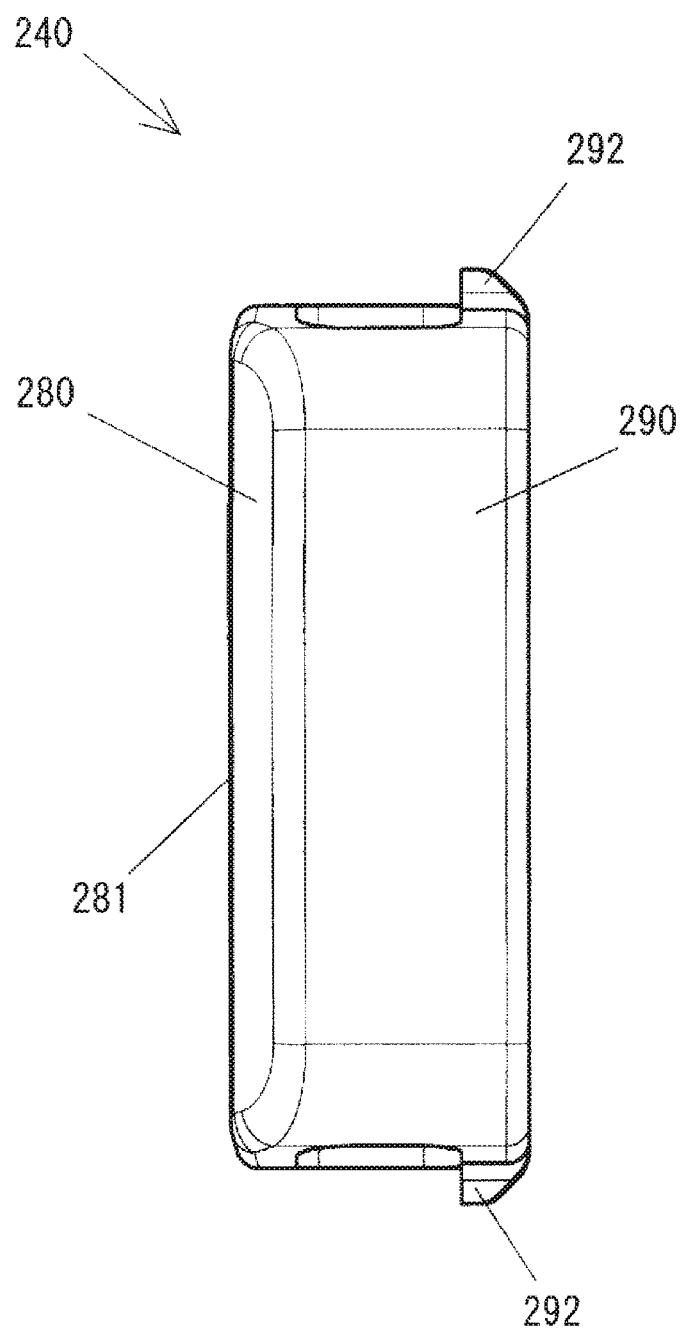
FIG. 34 is a front view of the pressing portion shown in FIG. 32.
Figure 37:
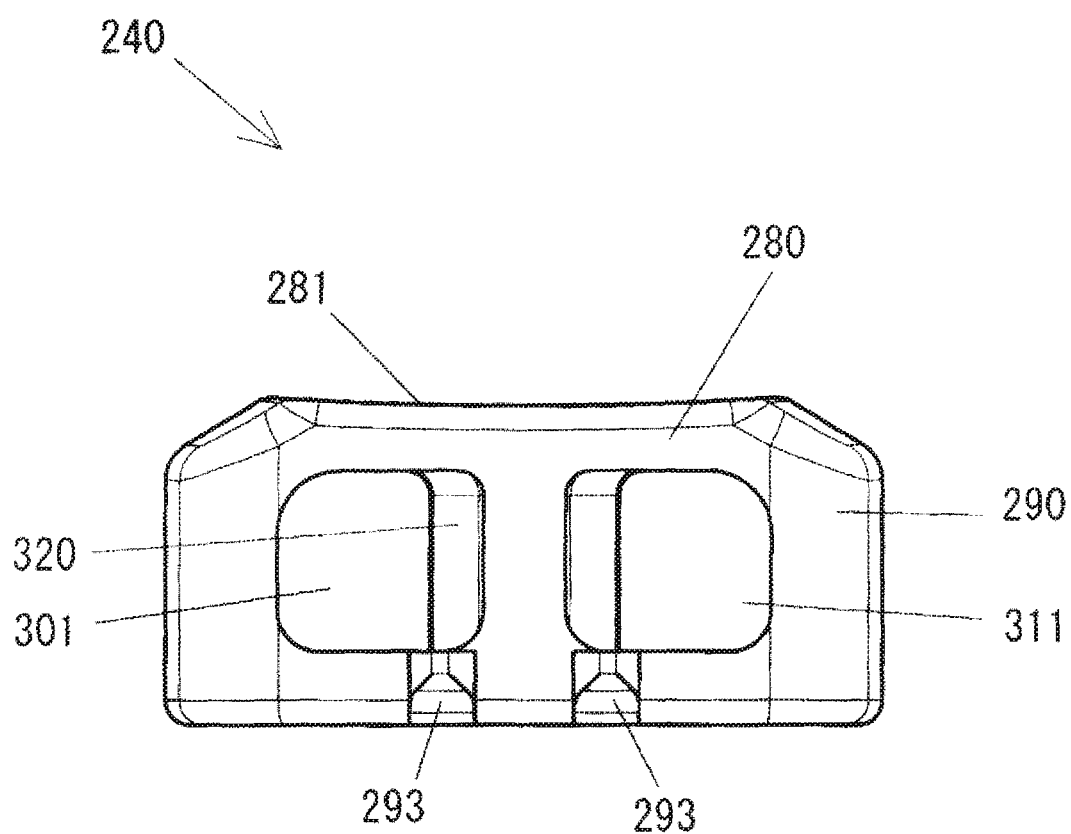
FIG. 37 is a plan view of the pressing portion shown in FIG. 32.

As shown in FIG. 32, FIG. 34, and FIG. 37, the front wall 280 comprises roughly the following respective portions.

(1) Pressing Face 281

The pressing face 281 is located on a front face of the front wall 280, i.e., an upper face in FIG. 32.

(Inside Wall 290)

The inside wall 290 includes basically a structure similar to the inside wall 90 of the first embodiment previously explained so as to omit the detailed explanation.

As shown in FIG. 32 to FIG. 37, the inside wall 290 includes roughly the following respective portions.

(1) Window Portion 291

Figure 33:
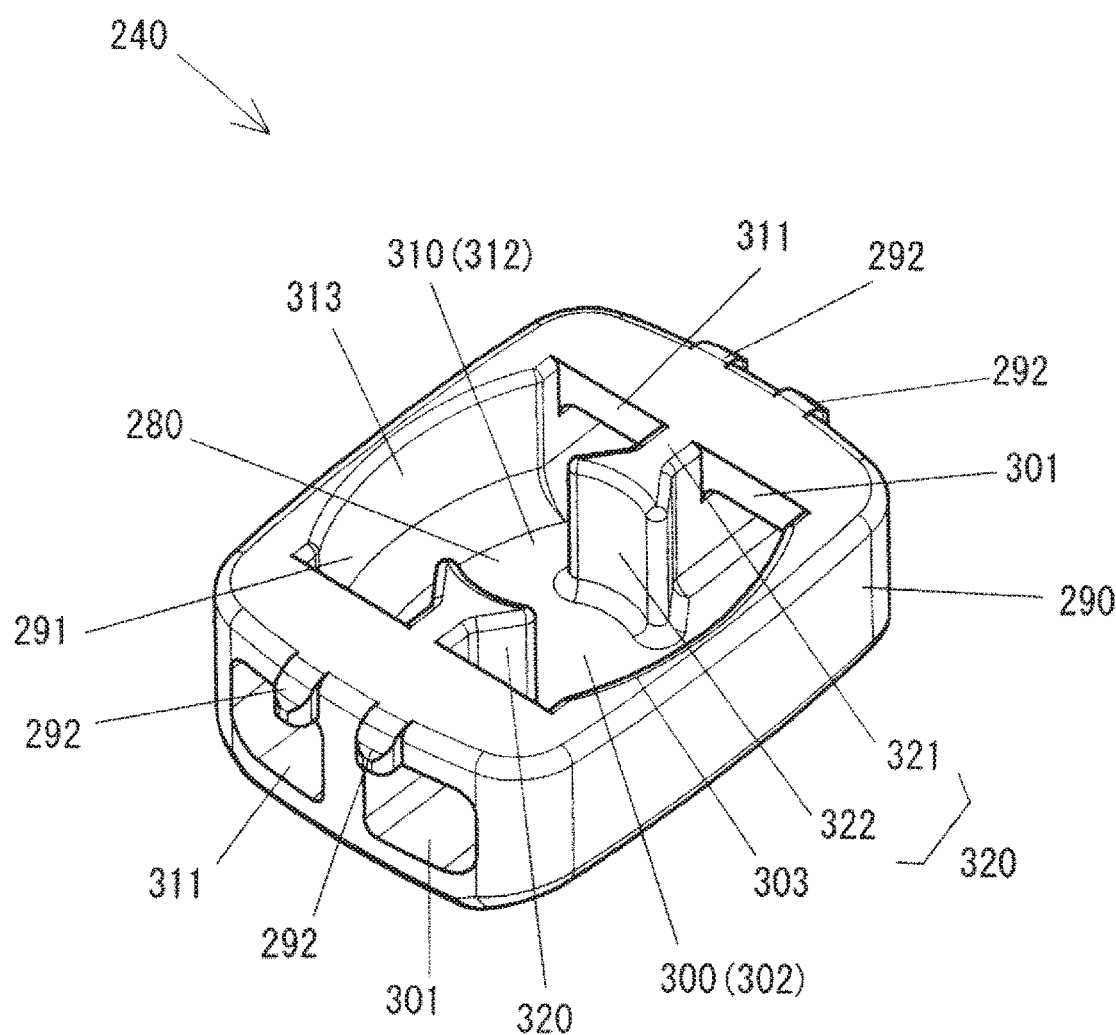
FIG. 33 is a perspective view of the pressing portion shown in FIG. 32 viewed from a lower side.
Figure 36:
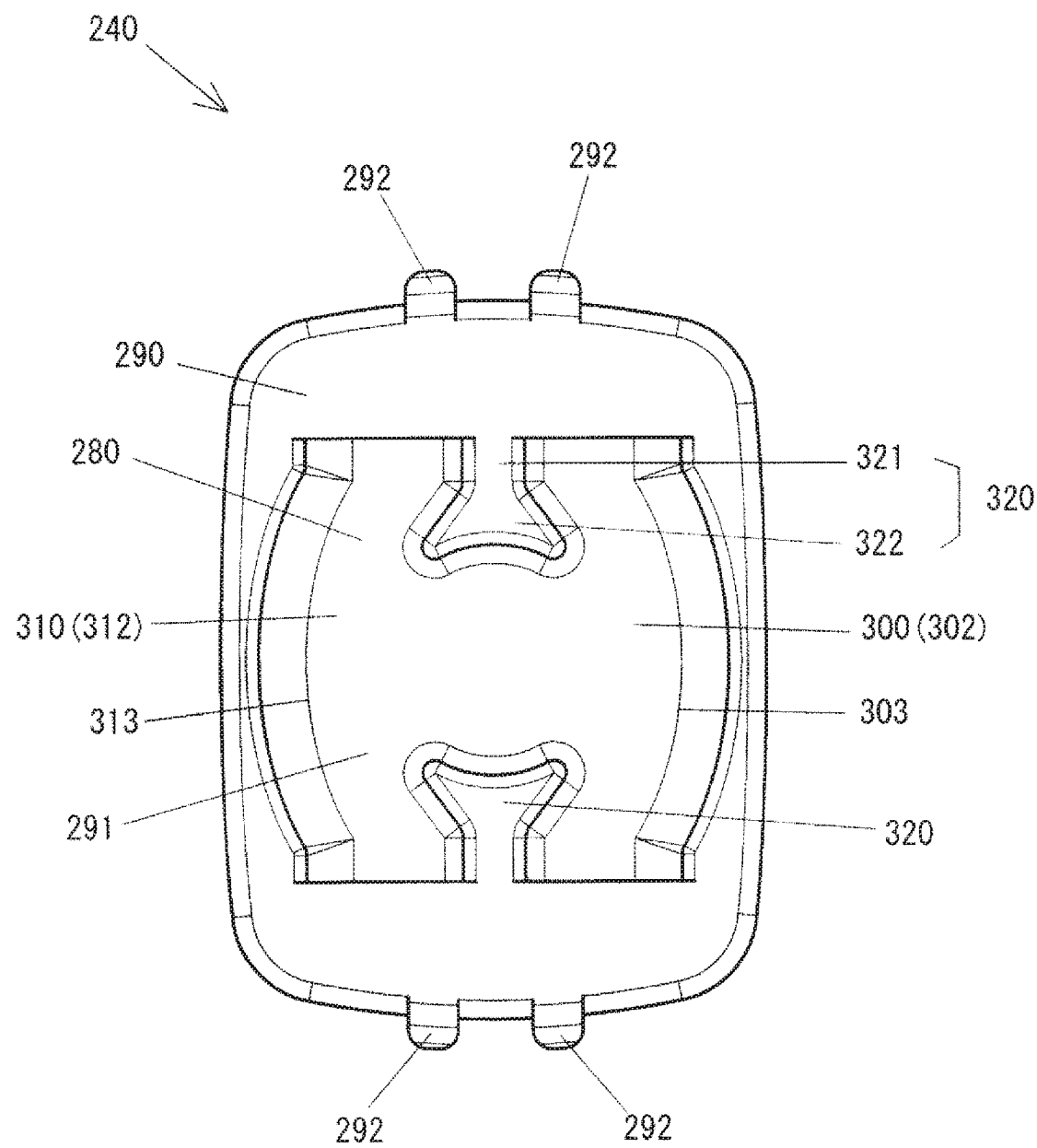
FIG. 36 is a right side view of the pressing portion shown in FIG. 32.

As shown in FIG. 33 and FIG. 36, the window portion 291 is formed by opening one portion on an opposite face side of the pressing face 281 of the pressing portion 240 in the later-described first and second bend insertion portions 302 and 312. By forming the window portion 291, the first and second bend insertion portions 302 and 312, and the later-described branch portions 320 of the pressing portion 240 can be easily formed at the molding time.

(2) Slide Projections 292

As shown in FIG. 32 to FIG. 37, the slide projections 292 project in the claw shape outwardly from an outer face of the inside wall 290.

Figure 35:
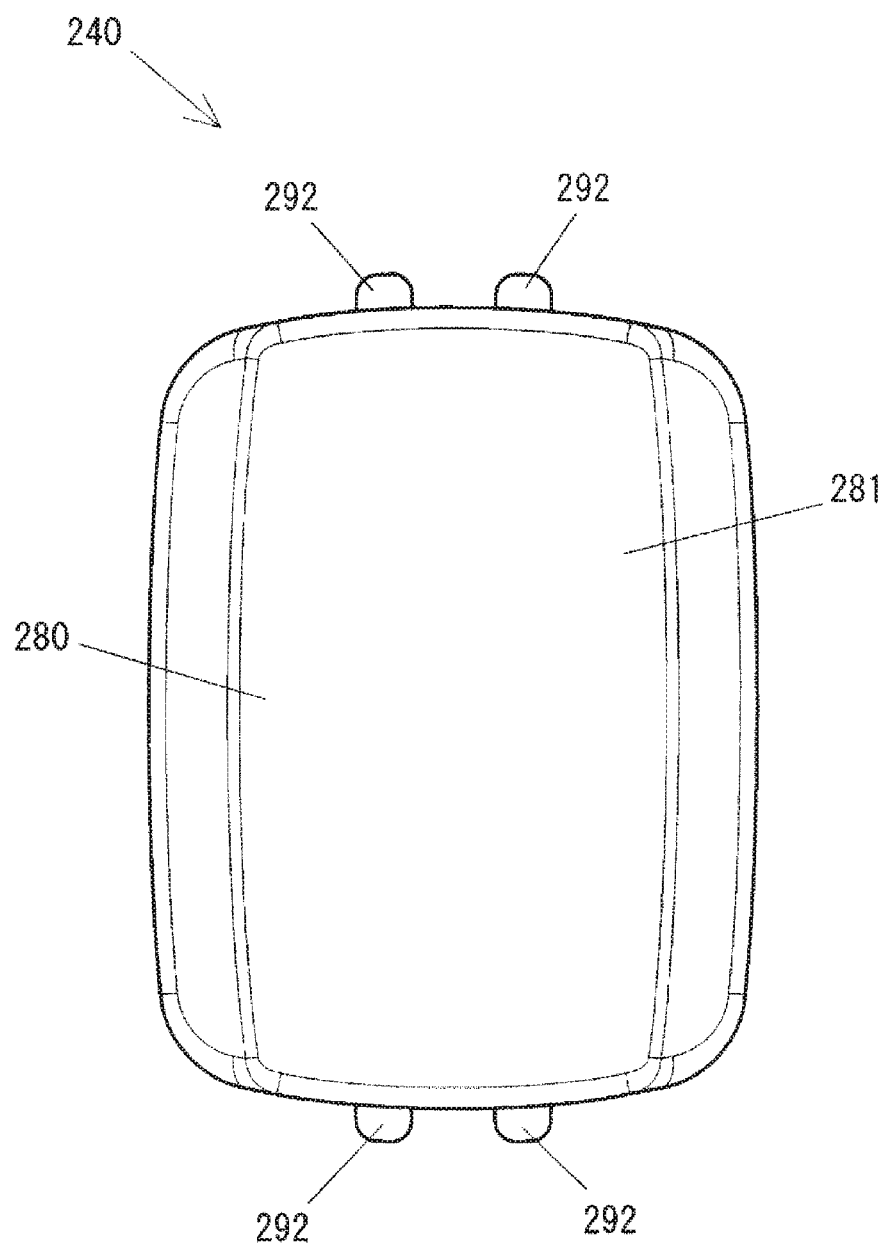
FIG. 35 is a left side view of the pressing portion shown in FIG. 32.

As shown in FIG. 34, the slide projections 292 are located on a back side of the inside wall 290, and on a right side in the same drawing. As shown in FIG. 34, the slide projections 292 are located above and below the inside wall 290, and as shown in FIG. 35 and FIG. 36, two slide projections 292 are located side by side in the right-and-left direction, and are provided with a total of four pieces at four portions.

Figure 23:
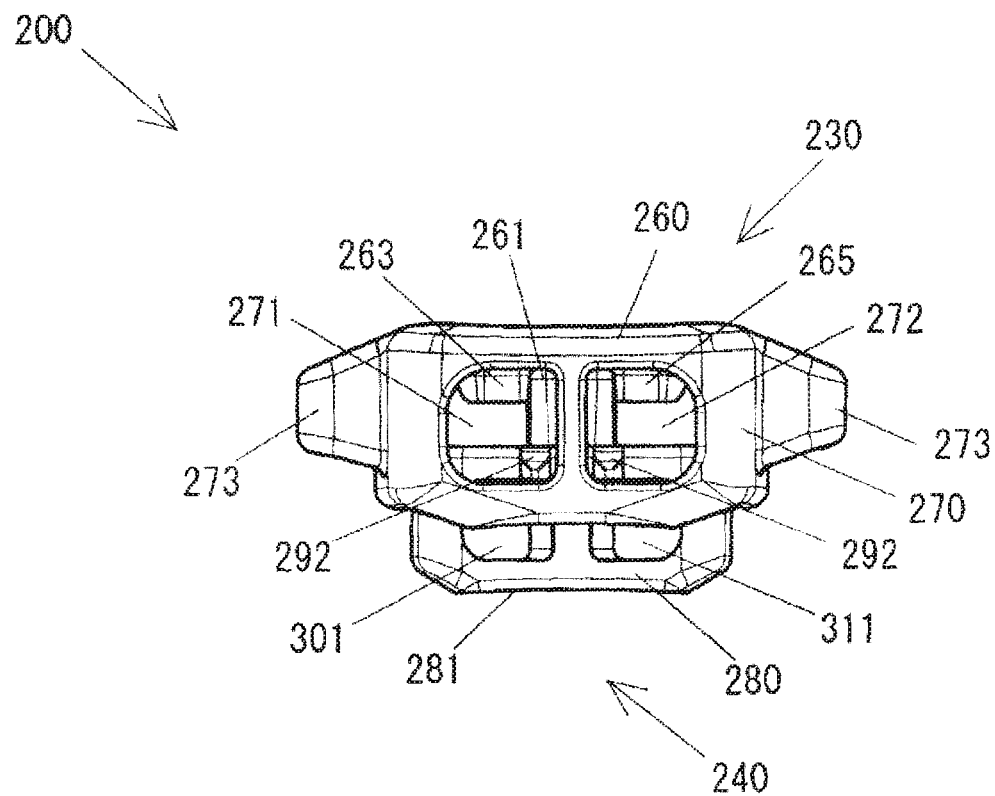
FIG. 23 is a plan view of the cord lock shown in FIG. 21.

As shown in FIG. 23, four slide projections 292 respectively fit into the first and second main-member-portion holes 271 and 272 of the main member portion 230, and when the pressing portion 240 moves in the front-and-back direction, the four slide projections 292 move along the first and second main-member-portion holes 271 and 272. The slide projections 292 abut against an inner edge located on a lower side in FIG. 23 in the first and second main-member-portion holes 271 and 272 so as to control the maximum projecting position of the pressing portion 240, and to prevent the pressing portion 240 from coming out of the opening portion 231.

(First and Second Pressing-Portion String Insertion Portions 300 and 310)

Figure 24:
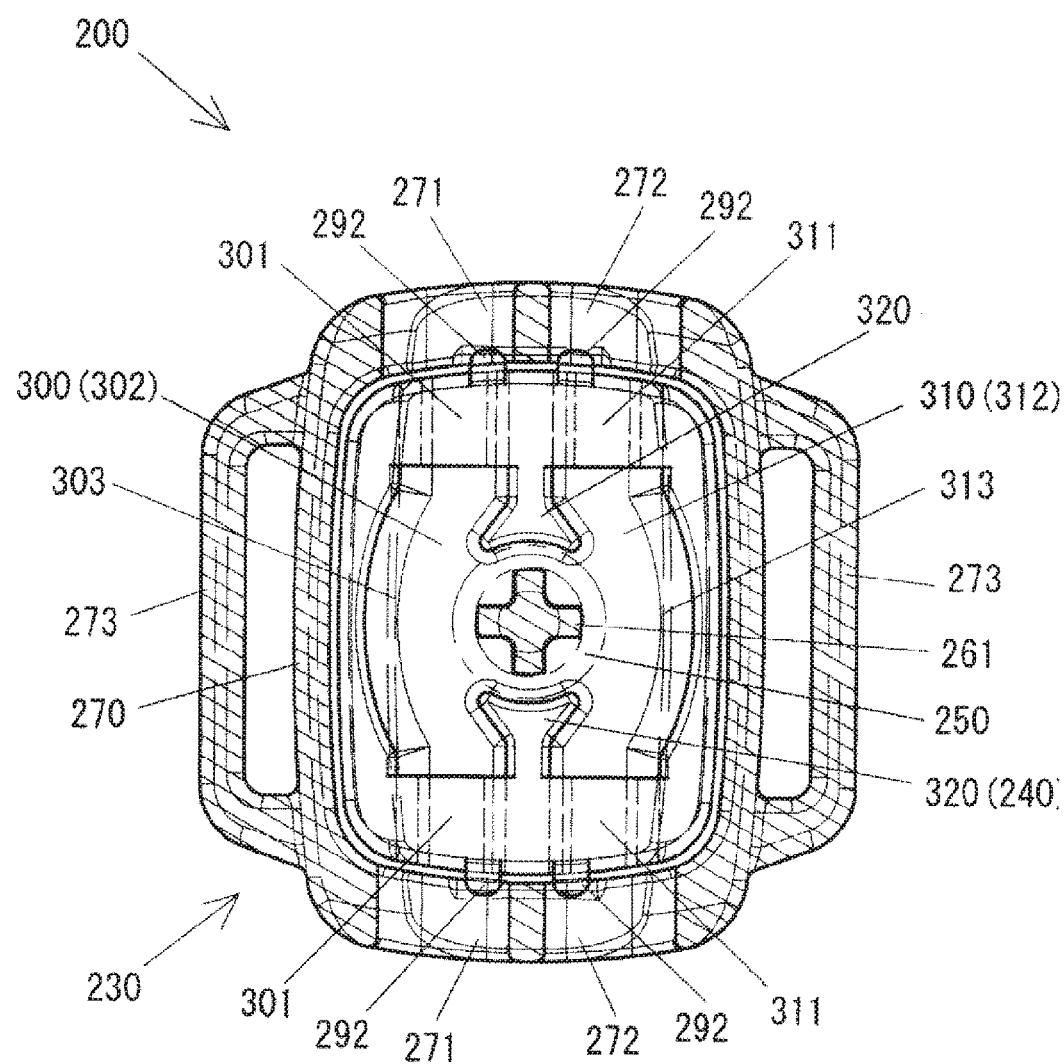
FIG. 24 is a cross-sectional view taken along a line E-E in FIG. 21 of the cord lock.

As shown in FIG. 33 and FIG. 34, the first and second pressing-portion string insertion portions 300 and 310 are located inside the pressing portion 240, and as shown in FIG. 24 and FIG. 25, can communicate with the first and second main-member-portion holes 271 and 272 of the main member portion 230.

In the first and second pressing-portion string insertion portions 300 and 310, as shown in FIG. 25, the first pressing-portion string insertion portion 300 is for passing the first end portion 221 of the string member 220.

The other second pressing-portion string insertion portion 310 is for passing the second end portion 222 of the string member 220, and as shown in FIG. 36, is formed to be linearly symmetrical to the first pressing-portion string insertion portion 300 by sandwiching the later-described two branch portions 320.

As shown in FIG. 33, FIG. 36, and FIG. 37, the first and second pressing-portion string insertion portions 300 and 310 comprise roughly the following respective portions.

(1) First and Second Pressing-Portion Holes 301 and 311

As shown in FIG. 32, FIG. 33, and FIG. 37, the first and second pressing-portion holes 301 and 311 are located respectively on both end portions of the first and second pressing-portion string insertion portions 300 and 310, and as shown in FIG. 24, in an assembled state wherein the pressing portion 240 is inserted from the opening portion 231 of the main member portion 230, the first and second pressing-portion holes 301 and 311 are disposed at a substantially same position as the first and second main-member-portion holes 271 and 272. The first and second pressing-portion holes 301 and 311 pass through an inside and outside of the inside wall 290, and are formed in an approximately rectangular shape substantially the same as the first and second main-member-portion holes 271 and 272.

(2) First and Second Bend Insertion Portions 302 and 312)

As shown in FIG. 24, FIG. 33, and FIG. 36, the first and second bend insertion portions 302 and 312 are located respectively in a middle of the first and second pressing-portion string insertion portions 300 and 310, and as shown in FIG. 25, are for inserting the first and second end portions 221 and 222 of the string member 220 to pass by respectively bending the first and second end portions 221 and 222 of the string member 220 inside the pressing portion 240.

In the first and second bend insertion portions 302 and 312, as shown in FIG. 24, in the assembled state wherein the pressing portion 240 is inserted from the opening portion 231 of the main member portion 230, the first bend insertion portion 302 is divided by a semicircle of an outer periphery of the coil spring 250 fitted externally into the boss portion 261 of the main member portion 230, the semicircle located on a left side in the same drawing, and the later-described first curve portion 303.

As shown in FIG. 24, in the assembled state, the other second bend insertion portion 312 is divided by the remaining semicircle of the outer periphery of the coil spring 250 fitted externally into the boss portion 261 of the main member portion 230, the semicircle located on a right side in the same drawing, and the later-described second curve portion 313.

(3) First and Second Curve Portions 303 and 313

As shown in FIG. 33 and FIG. 36, the first and second curve portions 303 and 313 form one portion of the first and second bend insertion portions 302 and 312, and as shown in FIG. 24, in the assembled state, a flat surface of the first and second curve portions 303 and 313 is formed in an arc shape around the boss portion 261 of the main member portion 230.

(Branch Portions 320)

As shown in FIG. 33 and FIG. 36, the branch portions 320 are located inside the pressing portion 240, and are located between the first and second pressing-portion string insertion portions 300 and 310. As shown in FIG. 25, the branch portions 320 guide the first and second end portions 221 and 222 of the string member 220 respectively inserted from the first and second pressing-portion holes 301 and 311 in a separating direction respectively.

As shown in FIG. 36, a pair of branch portions 320 is provided linearly symmetrical up and down in the same drawing.

As shown in FIG. 33 and FIG. 36, the branch portion 320 comprises roughly the following respective portions.

(1) Base Portion 321

As shown in FIG. 33 and FIG. 36, the base portion 321 is located inside an interval of the first and second pressing-portion holes 301 and 311, and is formed in a plate shape.

(2) Forked Portion 312

As shown in FIG. 33 and FIG. 36, the forked portion 312 is formed next to a tip portion of the base portion 321 in an approximately Y shape or an approximately T shape. The forked portion 312 curves an outside face located on both sides in a width direction by gradually increasing a thickness gradually from the base portion 321. As shown in FIG. 24, in the assembled state, end faces of the forked portion 312 curve around the boss portion 261 of the main member portion 230, and separately face the outer periphery of the coil spring 250 fitted externally into the boss portion 261.

(Use Method of the Cord Lock 200)

Next, the use method of the cord lock 200 in the assembled state will be explained.

As shown in FIG. 23, the pressing portion 240 protrudes from the opening portion 231 of the main member portion 230 by the spring force of the coil spring 250, and at that time, the first and second main-member-portion holes 271 and 272 of the main member portion 230 and the first and second pressing-portion holes 301 and 311 of the pressing portion 240 are alternately shifted in the front-and-back direction, i.e., an up-and-down direction in FIG. 23 to be positioned.

Although it is not shown in the drawings, when two first and second end portions 221 and 222 of the string member 220 pass through, the pressing face 281 of the pressing portion 240 is pushed in toward the opening portion 231 of the main member portion 230 against the spring force of the coil spring 250.

As shown in FIG. 24, when the pressing portion 240 is pushed in, positions of the first and second main-member-portion holes 271 and 272 and the first and second pressing-portion holes 301 and 311 match, so that the first and second main-member-portion holes 271 and 272 and the first and second pressing-portion string insertion portions 300 and 310 communicate.

In a state wherein the pressing portion 240 is pushed in, as shown in FIG. 25, tip portions of the two first and second end portions 221 and 222 are inserted into the first and second pressing-portion string insertion portions 300 and 310 from one of the first and second main-member-portion holes 271 and 272. When the two first and second end portions 221 and 222 are inserted, the two first and second end portions 221 and 222 bend in the arc shape along the bend insertion portion 102, and after that, come out of the other first and second main-member-portion holes 271 and 272.

After passing the two first and second end portions 221 and 222, when a force pushing the pressing portion 240 is released, by the spring force of the coil spring 250, the pressing portion 240 moves forward in a direction of projecting from the opening portion 231 of the main member portion 230. Consequently, the first and second main-member-portion holes 271 and 272 and the first and second pressing-portion holes 301 and 311 attempt to be shifted alternately in the front-and-back direction, i.e., the up-and-down direction in FIG. 23, so that the two first and second end portions 221 and 222 are locked inside the cord lock 200 so as to prevent a movement of the two first and second end portions 221 and 222.

Incidentally, when a length of the two first and second end portions 221 and 222 is adjusted, the lock state is released by pushing the pressing portion 240, so that the two first and second end portions 221 and 222 can relatively move relative to the cord lock 200.

| Explanation of Symbols | |
|---|---|
| (First embodiment) | |
| 10 a cord lock | 20 a string member |
| 30 a main member portion | 31 an opening portion |
| 40 a pressing portion | 50 a coil spring (urging device) |
| 60 a back wall | |
| 61 a boss portion | 62 a protrusion portion |
| 70 an outside wall | 71 main-member-portion holes |
| 72 slide grooves | 73 string passing frames |
| 80 a front wall | 81 a pressing face |
| 90 an inside wall | 91 slide projections |
| 100 a pressing-portion string insertion portion | 101 pressing-portion holes |
| 102 a bend insertion portion | 103 a window portion |
| 110 a cylinder concave portion | 111 a peripheral wall |
| (Second embodiment) | |
| 200 a cord lock | 220 a string member |
| 221 a first end portion | 222 a second end portion |
| 230 a main member portion | 231 an opening portion |
| 240 a pressing portion | 250 a coil spring (urging device) |
| 260 a back wall | 261 a boss portion |
| 262 and 263 first protrusion portions | 264 and 265 second protrusion portions |
| 270 an outside wall | 271 a first main-member-portion hole |
| 272 a second main-member-portion hole | 273 string passing frames |
| 280 a front wall | 281 a pressing face |
| 290 an inside wall | |
| 291 a window portion | 292 slide projections |
| 300 a first pressing-portion string insertion portion | 301 a first pressing-portion hole |
| 302 a first bend insertion portion | 303 a first curve portion |
| 310 a second pressing-portion string insertion portion | 311 a second pressing-portion hole |
| 312 a second bend insertion portion | 313 a second curve portion |
| 320 branch portions | |
| 321 base portions | 312 forked portions |

Incidentally, all contents of the specification, claims, drawings, and abstract of Japanese Patent Application No. 2016-112435 filed on Jun. 6, 2016 are cited in their entireties herein and are incorporated as a disclosure of the specification of the present invention.

What is claimed is:

1. A cord lock, comprising:
a main member portion including an opening portion on a front face, side walls surrounding the opening portion, and two main-member-portion holes through which a string member is configured to pass the side walls;
a pressing portion housed movably in a front-and-back direction inside the main member portion, and including a pressing face on a front face and a pressing-portion string insertion portion inside the pressing portion to communicate with the two main-member-portion holes, through which the string member is configured to pass an inside of the pressing portion; and
an urging device arranged between the main member portion and the pressing portion and urging the pressing portion in a direction away from the main member portion, the urging device being located between the two main-member-portion holes;

wherein the pressing-portion string insertion portion includes a bend insertion portion arranged at a side of the urging device outside an extension line of the urging device and between the two main-member-portion holes so that the string member is configured to pass at the side of the urging device, and the pressing portion includes an opening portion opened to the bend insertion portion at one portion on an opposite face side opposite to the pressing face.

2. A cord lock according to claim 1, wherein the pressing portion includes a cylinder concave portion, and the urging device is a coil spring housed in the cylinder concave portion.

3. A cord lock according to claim 2, wherein the bend insertion portion is provided in such a way so as to pass a peripheral wall of the cylinder concave portion.

4. A cord lock according to claim 1, wherein the bend insertion portion is arranged so that the string member is configured to be bent to pass the side of the urging device between the two main-member-portion holes.

5. A cord lock according to claim 1, wherein the pressing-portion string insertion portion includes two openings, and the two openings and the two main-member-portion holes are located at portions at least partially aligned to each other.

6. A cord lock, comprising:
   a main member portion including an opening portion on a front face, side walls surrounding the opening portion, and two main-member-portion holes through which a string member is configured to pass the side walls;
   a pressing portion housed movably in a front-and-back direction inside the main member portion, and including a pressing face on a front face and a pressing-portion string insertion portion inside the pressing portion to communicate with the two main-member-portion holes, through which the string member is configured to pass an inside of the pressing portion; and
   an urging device arranged between the main member portion and the pressing portion and urging the pressing portion in a direction away from the main member portion, the urging device being located between the two main-member-portion holes;
   wherein the pressing-portion string insertion portion includes a bend insertion portion arranged at a side of the urging device outside an extension line of the urging device and between the two main-member-portion holes so that the string member is configured to pass at the side of the urging device, and
   the two main-member-portion holes are arranged perpendicular to an urging direction of the urging device, and
   the bend insertion portion is curved about a central axis of the urging device toward the two main-member-portion holes.

7. A cord lock according to claim 6, wherein the main member portion further includes a boss portion arranged between the two main-member-portion holes and extending toward the opening portion to fit the urging device therearound, a protrusion portion protruding toward the opening portion and facing the pressing-portion string insertion portion, the protrusion portion being formed in an arc shape around the boss portion, and slide grooves formed on the side walls in a direction perpendicular to the two main-member-portion holes.

8. A cord lock according to claim 7, wherein the pressing portion further includes a concave portion arranged at a side of the pressing-portion string insertion portion, in which the urging device and the boss portion are housed, a peripheral wall sectioning the concave portion and the pressing-portion string insertion portion inside the pressing portion, along which the pressing-portion string insertion portion extends, and slide projections protruding outwardly from the pressing portion and fitting into the slide grooves to regulate movement of the pressing portion.

* * * * *